United States Patent
Vrachan et al.

(10) Patent No.: US 7,517,090 B2
(45) Date of Patent: Apr. 14, 2009

(54) REAL IMAGE PROJECTION DEVICE HAVING PLASTIC CURVED MIRROR FOR IMPROVING IMAGE AND CORRECTING ABERRATIONS

(75) Inventors: Jeffrey L. Vrachan, Agoura Hills, CA (US); Curtis L. Thornton, Simi Valley, CA (US)

(73) Assignee: Provision Interactive Technologies, Inc., Chatsworth, CA (US)

( * ) Notice: Subject to any disclaimer, the term of this patent is extended or adjusted under 35 U.S.C. 154(b) by 0 days.

(21) Appl. No.: 11/843,134

(22) Filed: Aug. 22, 2007

(65) Prior Publication Data

US 2008/0049198 A1 Feb. 28, 2008

Related U.S. Application Data

(60) Provisional application No. 60/839,740, filed on Aug. 23, 2006.

(51) Int. Cl.
*G03B 21/28* (2006.01)
*G03B 21/26* (2006.01)
*G02B 27/14* (2006.01)

(52) U.S. Cl. ............... 353/78; 353/20; 353/99; 353/28; 353/77; 359/631; 359/633

(58) Field of Classification Search ............... 353/78, 353/20, 98–99, 7, 10, 28, 122, 77; 359/478–479, 359/631, 633

See application file for complete search history.

(56) References Cited

U.S. PATENT DOCUMENTS

| | | | |
|---|---|---|---|
| 5,963,302 A | 10/1999 | Wittek | 352/38 |
| 6,076,638 A | 6/2000 | Gertz | 187/414 |
| 6,556,272 B1 | 4/2003 | Du et al. | 352/85 |
| 6,598,976 B2 * | 7/2003 | Westort et al. | 353/28 |
| 6,602,475 B1 | 8/2003 | Chiao | 422/124 |
| 6,607,275 B1 | 8/2003 | Cimini et al. | 353/28 |
| 6,733,140 B2 * | 5/2004 | Westort et al. | 353/98 |
| 6,744,488 B2 | 6/2004 | Schermerhorn | 352/85 |
| 6,817,716 B1 | 11/2004 | Hines | 353/10 |
| 6,848,219 B2 | 2/2005 | Standard et al. | 52/6 |

* cited by examiner

*Primary Examiner*—Diane I Lee
*Assistant Examiner*—Magda Cruz
(74) *Attorney, Agent, or Firm*—J.C. Patents

(57) ABSTRACT

A device using a low-cost plastic curved mirror and several combinations of methods for reducing aberrations to improve a real image projection system is provided, so as to reduce ghost and astigmatism phenomenon. The real image projection system includes a curved mirror having two different optical surfaces of revolution, one on a convex surface and the other on a concave surface. The real image projection system may include at least a curved reflector positioned in a tilted configuration, and an optical axis of the reflector does not coincide with a viewing axis. A beampath between a target source and the curved reflector neither passes through a beamsplitter nor is reflected thereby. The real image projection system may further include a circular polarizer for circularly polarizing a light beam in a primary light path between the mirror and the real image, eliminating ghost image caused by outside light sources.

5 Claims, 37 Drawing Sheets

Target object

Real image
(Field curvature distortion)

Target object
CRT with pin-cushion

Real image with field curvature distortion

| Beamsplitter characteristics | | | | | |
|---|---|---|---|---|---|
| Absorption % | Transmittance % | Reflectivity % | Image % | Ghost % | Ghost/image ratio |
| 30% | 40% | 60% | 14.28% | 6.66% | 46.67% |
| 35% | 40% | 60% | 13.26% | 5.75% | 43.33% |
| 25% | 35% | 65% | 14.50% | 5.86% | 40.38% |
| 30% | 35% | 65% | 13.54% | 5.10% | 37.69% |
| 35% | 35% | 65% | 12.57% | 4.40% | 35.00% |
| 40% | 35% | 65% | 11.60% | 3.75% | 32.31% |
| 45% | 35% | 65% | 10.64% | 3.15% | 29.62% |

FIG. 19

REAL IMAGE PROJECTION DEVICE HAVING PLASTIC CURVED MIRROR FOR IMPROVING IMAGE AND CORRECTING ABERRATIONS

CROSS-REFERENCE TO RELATED APPLICATION

This application claims the priority benefit of U.S. Provisional Application Ser. No. 60/839,740, filed on Aug. 23, 2006. All disclosure of the U.S. provisional application is incorporated herein by reference.

BACKGROUND OF THE INVENTION

1. Field of the Invention

The present invention relates to a field of optical display systems. More particularly, the present invention relates to a real image projection device improved by using a low-cost plastic curved mirror and using several combinations of methods for reducing aberrations, so as to reduce ghost and astigmatism phenomenon.

2. Description of Related Art

The present invention pertains to a real image projection system, and in particular, to a system in which an image of a real object is formed in space, giving the illusion that a real object exists at that point in space, when in reality it does not. Real image projection systems normally incorporate spherical or parabolic mirrors for imaging. In large systems, where the viewer is located at a significant distance from the image being viewed, optical aberrations, such as spherical aberrations and astigmatism in particular, are not as much of a problem as in small systems where the viewer is located close to the image. Astigmatism causes eye strain when viewing the image for a long period of time, and this has been one of the primary reasons that small real image projection systems have not been widely incorporated in gaming applications as well as in workstation applications.

Another reason for the lack of wide-spread acceptance of the small real imaging systems is that ghost images in the systems are much more noticeable when viewing the display from a close distance. Many approaches have been used to reduce ghosting, including tinted beamsplitters and circular polarizers, none of which are extremely effective. Even with the use of a circular polarizing window, the ghost images are visible even though they can be significantly reduced. The circular polarizing windows typically have a maximum transmission of 42%, which significantly reduces image brightness. Thus, in an arcade or other public area that is brightly lit, the real image is usually difficult to see.

Other optical aberrations present problems for the real image projection systems. For example, field curvature distortion is a significant problem for the small systems because of the shorter focal lengths typically associated therewith. Particularly, a rectangular shape displayed on a CRT screen projects as a "fish-eyed" real image of the target object. The sides of the rectangular image appear to bow outward and the center of the rectangular image appears magnified, as compared to the edges. This is a natural phenomenon of spherical mirrors, and cannot normally be corrected without a significant number of additional lenses in the beampath, which significantly increases a size of the display system as well as the cost of manufacturing such displays.

Optics has been designed to compensate for some of these aberrations, such as spherical aberrations, through use of a Mangin mirror that has a reflective convex spherical surface with a longer radius, and a transmissive concave spherical surface with a shorter radius. However, this approach is not practical for the real image projection system, because the image source or the target is not a point at the focal point or center of curvature of the mirror, as in a single point imaging system. In the real image projection system, the target is usually a rectangle, such as a monitor screen, where only the center of the screen is on the axis or at the focal point of the mirror. The Mangin dual curve corrective mirror could be significantly improved by replacing the concave spherical surface with an aspheric surface of revolution, which will reduce the astigmatism for points offset from the axis of the mirror. Thus, the Mangin mirror incorporating two spherical curves is extremely effective for points along the axis of an on-axis system, but the problem of astigmatism becomes progressively worse as the target point deviates from the axis of the mirror curvature. An aspheric curve on the concave surface would optimize the correction and reduce the astigmatism for a large area around the axis or focal point.

Another reason that the small systems have not become a mainstream is because of the difficulty in producing curved optical apparatuses in reasonable amount. The problem is compounded when corrective optical curvatures are incorporated.

SUMMARY OF THE INVENTION

The present invention is directed to a real image projection device improved by using a low-cost plastic curved mirror and using several combinations of methods for reducing aberrations, so as to reduce ghost and astigmatism phenomenon.

The present invention is directed to a real image projection device improved by using a low-cost plastic curved mirror and using several combinations of methods for reducing aberrations, which includes a single curved mirror having two different optical surfaces of revolution, one on a convex surface and one on a concave surface.

The present invention is directed to a real image projection device improved by using a low-cost plastic curved mirror and using several combinations of methods for reducing aberrations, which includes a single curved reflector. The at least one curved reflector is positioned in a tilted configuration, in which an optical axis of the reflector does not coincide with a viewing axis, and a beampath between a target source and the curved reflector neither passes through a beamsplitter nor is reflected thereby.

The present invention provides a real image projection system, which further includes a circular polarizer for circularly polarizing a light beam in the primary light path between the mirror and the real image, whereby an outside light beam entering the system is substantially blocked before exiting the system, thereby substantially eliminating ghost image formation caused by outside light sources.

There are two problems in manufacturing mirrors with minimal aberrations and astigmatism. First, the quality of the surface of revolution must be very precise. This typically involves precision polishing of the surfaces, thus limiting the amount of such mirrors that can be produced in a given time, and creating an additional cost other than the generally-acceptable cost for a commercial real image display system. Besides, aspheres are extremely difficult to be produced and must be hand polished to form precise curves. Thus, the complexity of the aspheric optical surfaces of revolution prevents the mirror from being produced in large amount, therefore a desirable manufacturing method is injection molding.

In an embodiment of the present invention, a plastic injection molding is used for manufacturing the plastic parts of a low-cost plastic spherical mirror. The injection molding method can attain higher tolerance, improved process control, and higher repeatability. Metal molds used in the injection molding method can hold a tight tolerance for a general envelope dimension of a mirror (not the mirror surface). The spherical radius tolerance is also kept at the tight tolerance. The above tolerances are equivalent to the tolerance of a glass spherical mirror. The metal molds for injection molding may hold the tight tolerance.

A plurality of plastic material formulations meeting several performance standards has been developed. The performance standards include material strength, thermal stability, water absorption, mold shrinkage, material flow into the mold, UL recognition, manufacturing considerations, surface density, lubricant content, and scratch resistance. The plastic material formulation is selected based on testing results of the metal molds and of the parts.

Vacuum metallization or vacuum deposition may be used to deposit a reflective mirror coating serving as the mirror surface of the spherical mirror. The metal deposited on the plastic surface preferably has a thickness of several microns. A protective overcoat is sprayed on the metalized surface after a metallization phase is carried out. The parts undergoing the vacuum metallization has a sufficient quality because the quality control on the coated plastic material surface is improved by minimizing the amount of flaws on the plastic surface resulting from the molding process.

The method for manufacturing the plastic parts of the plastic spherical mirror according to a first embodiment of the present invention includes the following steps:

a) designing a plastic parts, such that a mirror surface is supported to avoid aberration or distortion;

b) accurately positioning plastic injection gates, so as to ensure the elimination of remnants or knit lines generated by a plastic resin flow;

c) selecting a preferred physical size of the plastic parts, so as to meet a plurality of optical performance requirements and physical design requirements;

d) forming a plurality of support walls at strategical positions in the plastic part;

e) selecting the plastic material formulation, so as to be specially designed to resist deformation;

f) fabricating tools with a preferred grade of steel having a preferred polished surface;

g) heating and/or cooling the metal mold to form an optimal curvature on the mirror surface;

h) depositing a thin layer of a reflective metal coating onto the mirror surface of the plastic parts; and i) forming a protective overcoat on the metalized mirror surface.

By conducting the above method of manufacturing the plastic spherical mirror according to the first embodiment of the present invention, a plastic spherical mirror having the following features is manufactured. The plastic spherical mirror has a plastic parts having a mirror surface supported on an edge of a mirror through a plurality of wall structures, a plastic parts of preferred physical size, a plastic material formulation, a superior optical-grade surface formed by polishing the mirror surface used for the metal mold, an optimal curvature of mirror surface formed by heating and cooling the metal mold, a thin layer of a reflective metal coating deposited onto the mirror surface, and a protective overcoat formed on the metalized mirror surface. Moreover, in a second embodiment, the plastic spherical mirror further includes a plurality of strategically-placed injection gates and the plastic parts having the preferred physical size. In addition, a plurality of support walls is disposed in the plastic parts, such that the final dimension of the plastic parts in the second embodiment matches the final dimension of a glass counterpart.

Therefore, in the present invention, the superior real image projection system incorporating a precision, dual-curve, and low-cost plastic curved mirror, a tilted off-axis configuration, and a neutral density window or a beamsplitter is provided, which has a brighter image, effectively reduced ghost, and significantly reduced optical aberration and distortion.

In order to make the aforementioned and other objects, features and advantages of the present invention comprehensible, several embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 19 shows the relative ghost to image brightness ratio for various neutral density beamsplitter specifications.

DESCRIPTION OF EMBODIMENTS

For the sake of convenience of understanding, several crucial terms and phases are provided first.

A "plastic material formulation" includes homopolymer, thermoplastic, copolymer, polymer blend, thermosetting resin, polymer blend, any one of the above materials containing performance additives, fillers, or fibers, or any other similar types of polymer material formulation.

A "depositing of a reflective metal coating onto the mirror surface of the plastic parts" may be accomplished by vacuum deposition, spin coating, spraying, vacuum metallization, sputtering, or any other similar system capable of depositing the reflective metal coating on the order of several microns.

"Low-cost" is defined as a favorable cost differential as compared to glass of the same dimensional configuration serving as the spherical mirror.

A "glass counterpart" is defined as the glass spherical mirror of the same dimensional configuration and possesses equivalent functions as that of the plastic spherical mirror.

Figure 1:
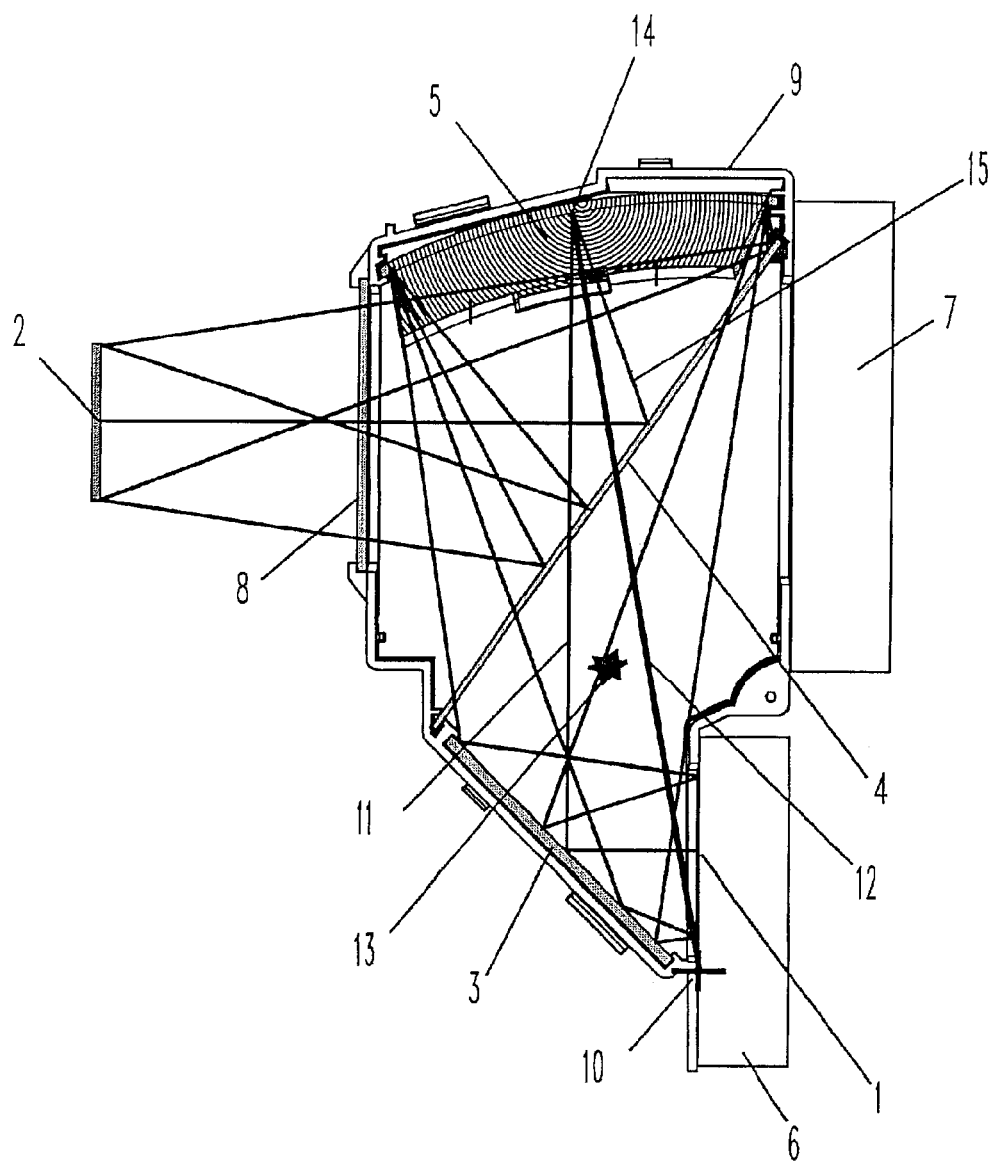
FIG. 1 shows the optical configuration and the orientation of optical components of the real image projection system of the present invention.

FIG. 1 shows an embodiment of the optical system for the micro real image display system of the present invention. The image source is an LCD or a monitor 6 which emits a light beam 1 from the screen to an optional fold mirror 3. The fold mirror is a flat reflector positioned at an angle such that the light from the target source 1, located at about the center of the LCD 6, is reflected off the surface of the fold mirror 3, and directed to the physical center of the reflective surface 14 of the tilted curved mirror 5. The diverging light beam passes through the beamsplitter 4 and strikes the reflective surface 14 of the curved reflector 5. The curved mirror is tilted to an off-axis condition. In an embodiment, the optical axis 12 of the curved mirror 5 is tilted between 10 and 20 degrees 13 toward the back of the display, offset from the target axis 11 or an imaging beam. An imaginary line from the center of a radius 10 to the surface of the curved mirror 14 defines the optical axis 12 of the curved mirror 5. In the system shown in FIG. 1, the diverging light beam from the target source 1 strikes the surface of the curved mirror and reflects a converging light beam 15 at a complimentary angle in relation to the optical axis 12 of the curved mirror 5. The converging light beam 15 reflects off of the beamsplitter 4 at a complimentary angle to the surface of the beamsplitter 4, and is directed to the viewing aperture 8, which, in this example, includes an optional neutral density filter glass. The light beam passes through the neutral density window and focuses at the focal point of the system 2, forming a real image in free space. The system shown in FIG. 1 also has an optional larger background LCD or a monitor 7 positioned behind the beamsplitter 4, such that the background LCD screen 7 is visible as a background scene when viewed through the window 8.

Figure 2:
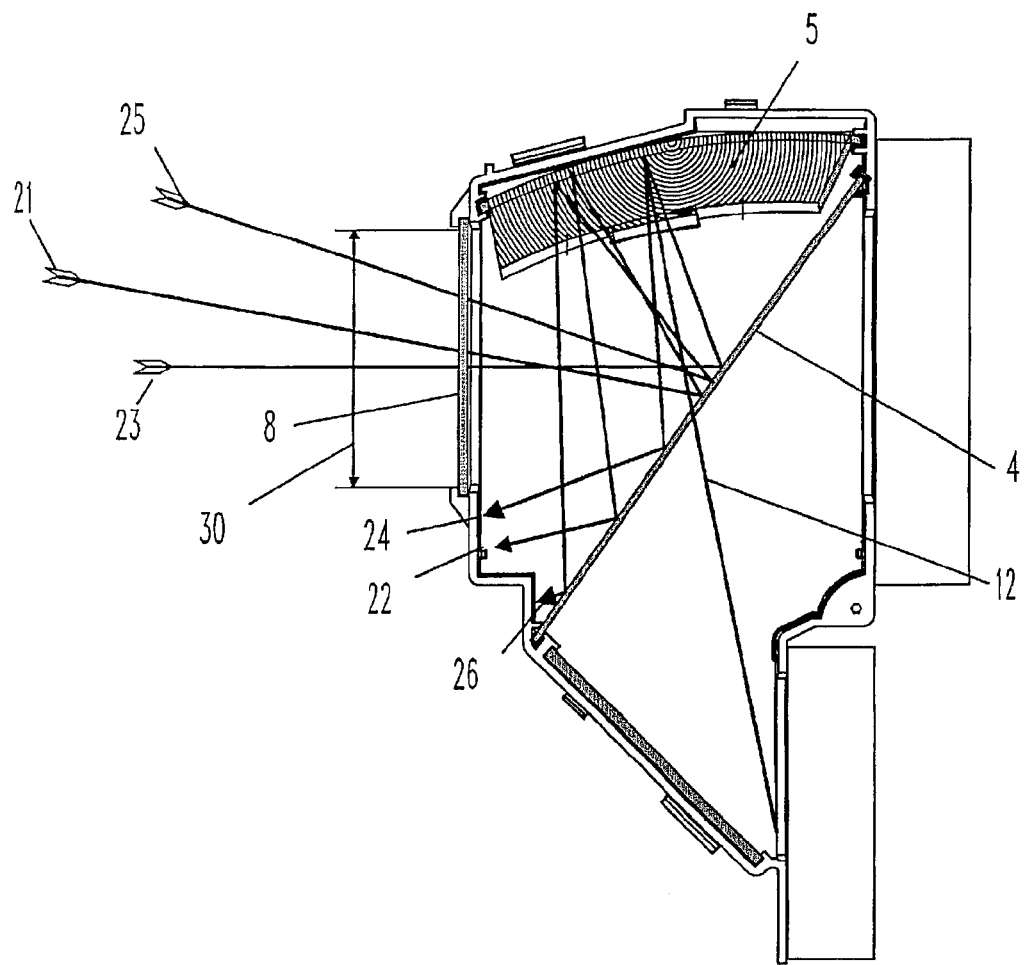
FIG. 2 shows how ghost imaging of light from outside of the system of the present invention is blocked from exiting, and therefore is not visible to the viewer.

FIG. 2 shows the ghost imaging of stray lights of the system described in FIG. 1. The light beam from an external source 21 at the outside of the display system enters through the neutral density window, striking the beamsplitter 4 and reflecting to the surface of the tilted curved mirror 5. The light beam is reflected from the curved mirror at a complimentary angle to the axis 12 of the curved mirror, and then reflects again off the surface of the beamsplitter 4. Because the curved mirror 5 is tilted off-axis, the light beam reflecting off the beamsplitter 4 is directed below the window aperture 30, and does not exit the system. Therefore, no ghost image is visible.

Figure 3:
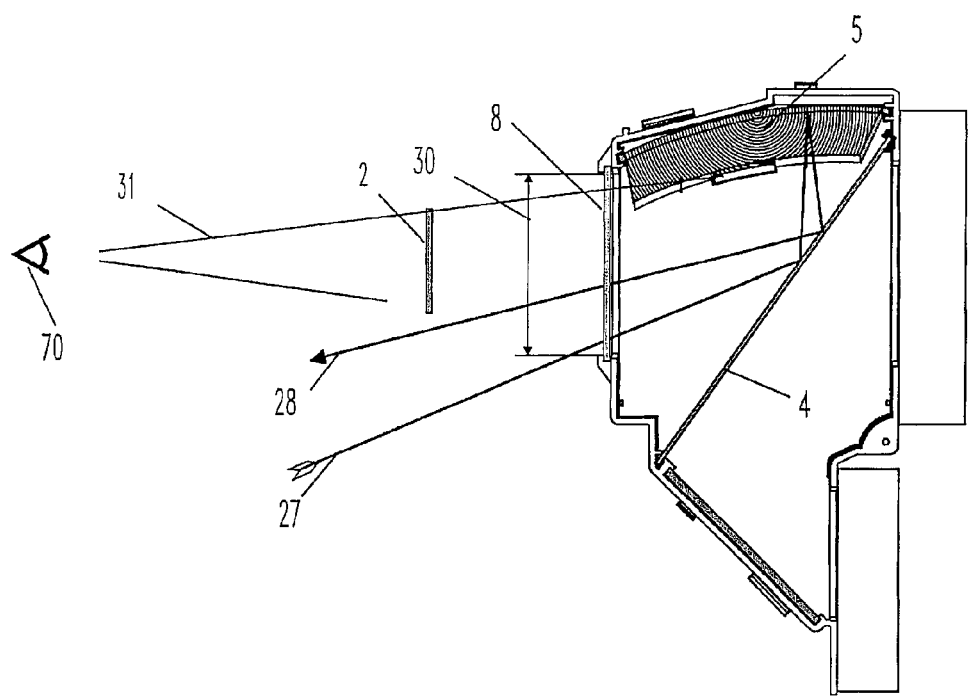
FIG. 3 shows how light beams entering the window of the system from a source at floor level are imaged outside of the normal view area.

FIG. 3 shows the ghosting created from light sources below a viewing level 70. A light beam 27 entering the window aperture 30 reflects off the beamsplitter 4, then off the tilted curved mirror 5. The reflected light beam reflects again off the beamsplitter surface 4 and is directed downward. This reflected light beam 28 escapes through the window, but can only be seen when viewed at an upward angle. In a small system, it is easier to see these ghost images than in a large system, so the neutral density window 8 is incorporated to reduce the intensity of the ghost image. The light beam 27 entering through the window 8 is reduced by 30% in brightness, reflects off the beamsplitter, the curved mirror, the beamsplitter again, and passes again through the window, reducing the ghost brightness by 30% again. When using a neutral density window 8, it is advantageous to incorporate a beamsplitter 4 with a higher ratio of transmission to reflection. Since the target of an imaging light beam is both reflected and transmitted by the beamsplitter, the ratio of reflectance to transmission poses influence on brightness slightly. The ghost imaging light beam reflects twice off the beamsplitter 4, such that a lower reflection to transmission ratio is desirable. For example, when a 65R/35T beamsplitter 65% transmission is given, 35% reflection results in a 22.7% transmission or brightness. It is then reduced by 30% as it exits through the neutral density window 8, resulting in 15.9% image brightness. The ghost imaging light beam from the outside of the system 27 passes through the neutral density window 8, resulting in 70% brightness, reflects off the beamsplitter at 35% for 24.5%, reflects again off the beamsplitter 4 at 35%, resulting in 8.57%, and finally exits through the neutral density window 8, resulting in a ghost image intensity of 6%, as compared to the 15.9% real image brightness. This illustration does not account for transmission losses from the curved mirror or glass surfaces, but is intended to explain the principle of ghost reduction through use of a neutral density window.

Figure 4:
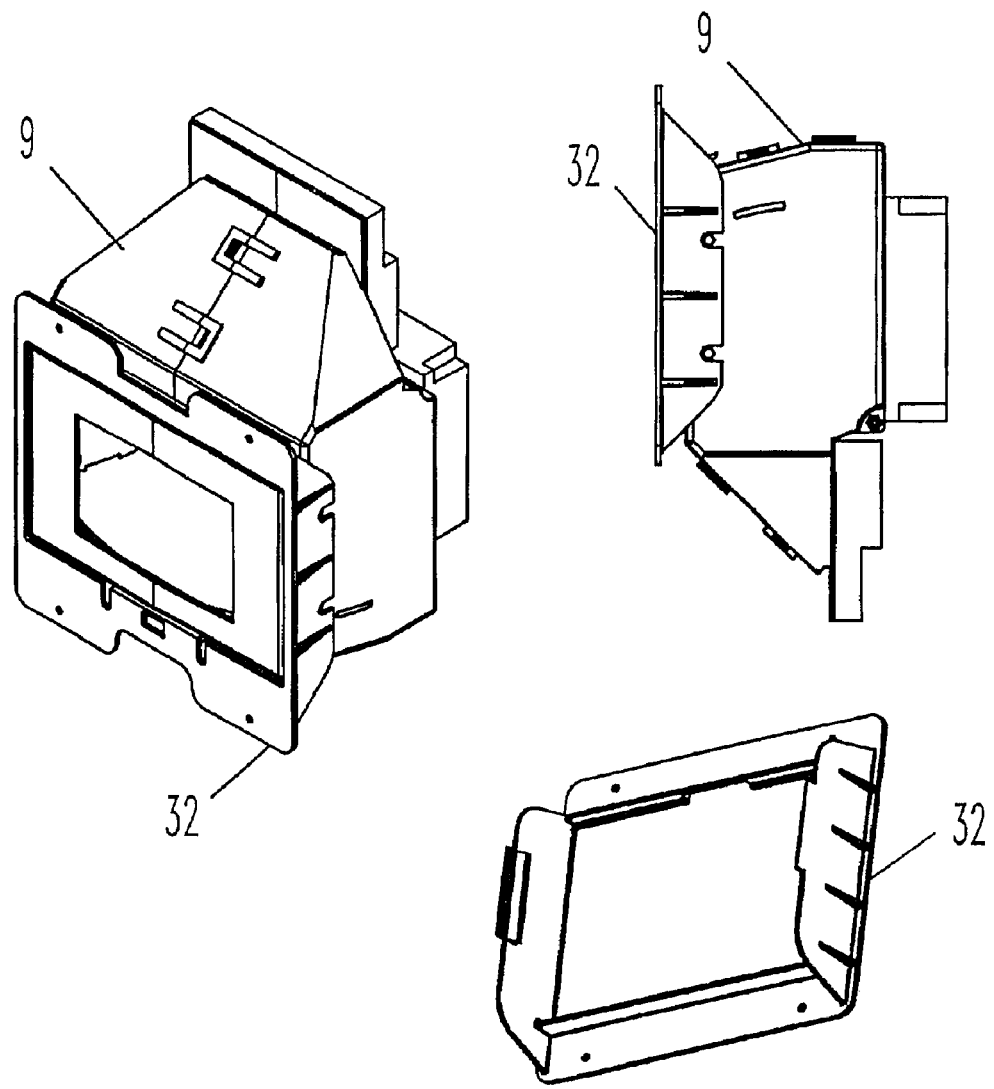
FIG. 4 shows a typical injection molded housing for a small system with mounting flanges.

FIG. 4 shows an example of a housing 9 in a real image projection system and a mounting flange 32 for a small "micro-system". The case housing is designed for mass injection molding, and the mounting flange allows the device to be easily incorporated into OEM equipment, such as vending and ATM machines.

Figure 5:
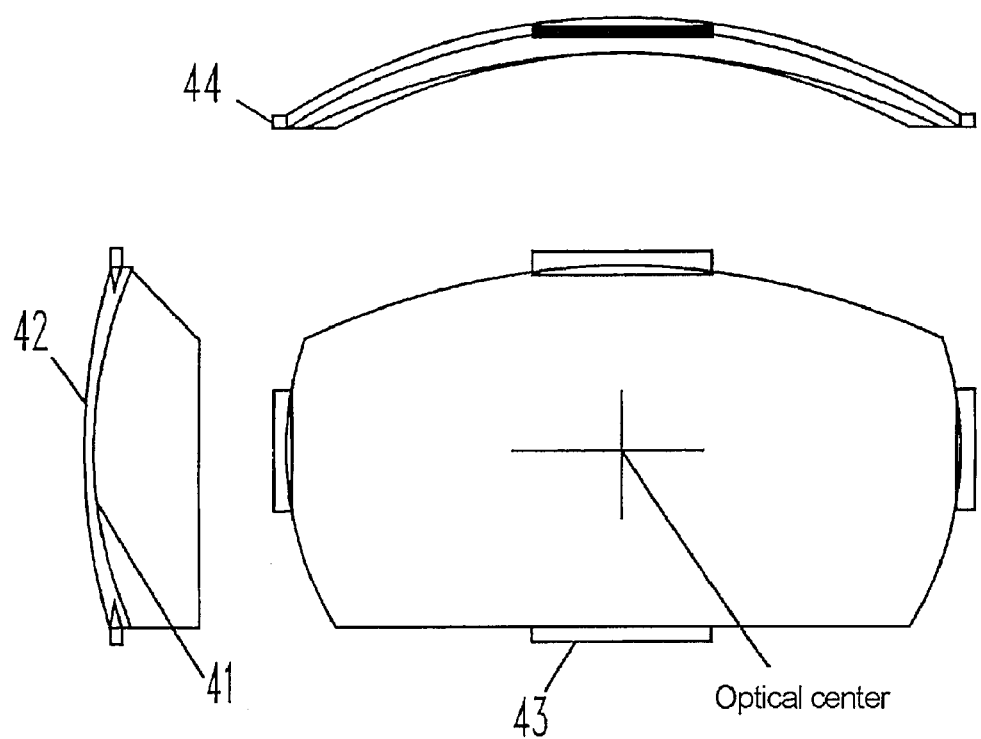
FIG. 5 shows an injected molded curved mirror of two distinct surfaces of revolution, and the mounting tabs are necessary for stress-free mounting.

FIG. 5 shows an embodiment of the injection molded mirror used in the micro-system of the present invention. The curved mirror has mounting tabs 43 and 44 on its edges to allow free-floating stress-free mounting in the imaging system. The mirror is fabricated by optical grade acrylic. The material choice is determined by the index of refraction required by the system design. The curved mirror has two distinct surfaces of revolution, one surface is on the convex surface 42, to which the reflective coating is applied, and the other surface of revolution is on the concave surface 41, which acts as a corrective lens element for reduction of aberrations and distortion. There are several combinations of curves or surfaces of revolution that may be incorporated in the mirror. However, the optimum is a spherical surface of revolution on the convex surface 42 in combination with an aspheric surface of revolution on the concave surface 41. In some cases, it is advantageous to have a mirror with two different aspheric surfaces of revolution, depending upon how the system is used and the effects of the aberrations created by that application.

The injection molded mirror may be fabricated by means of plastic injection molding, so as to manufacture the low-cost plastic curved mirror, and the detailed manufacturing flow is illustrated later with reference to FIGS. 34 to 37.

Figure 6:
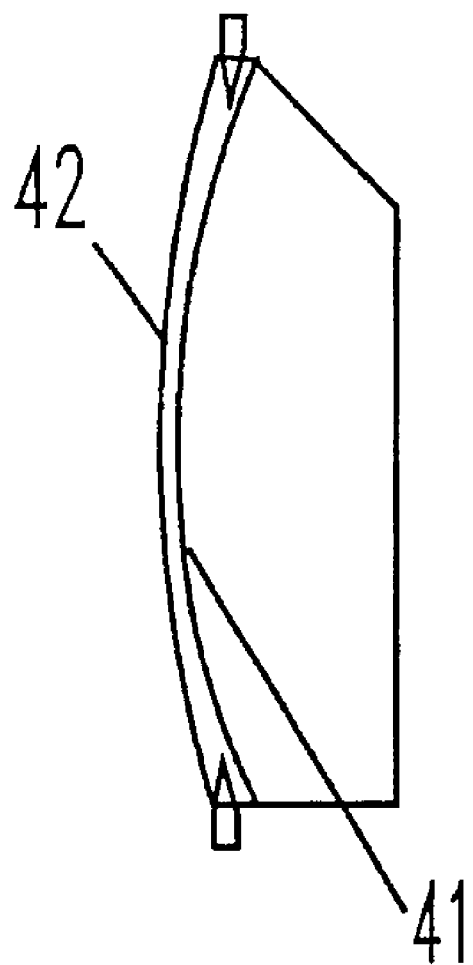
FIG. 6 shows the two surfaces of revolution of the curved mirror of the present invention.
Figure 7:
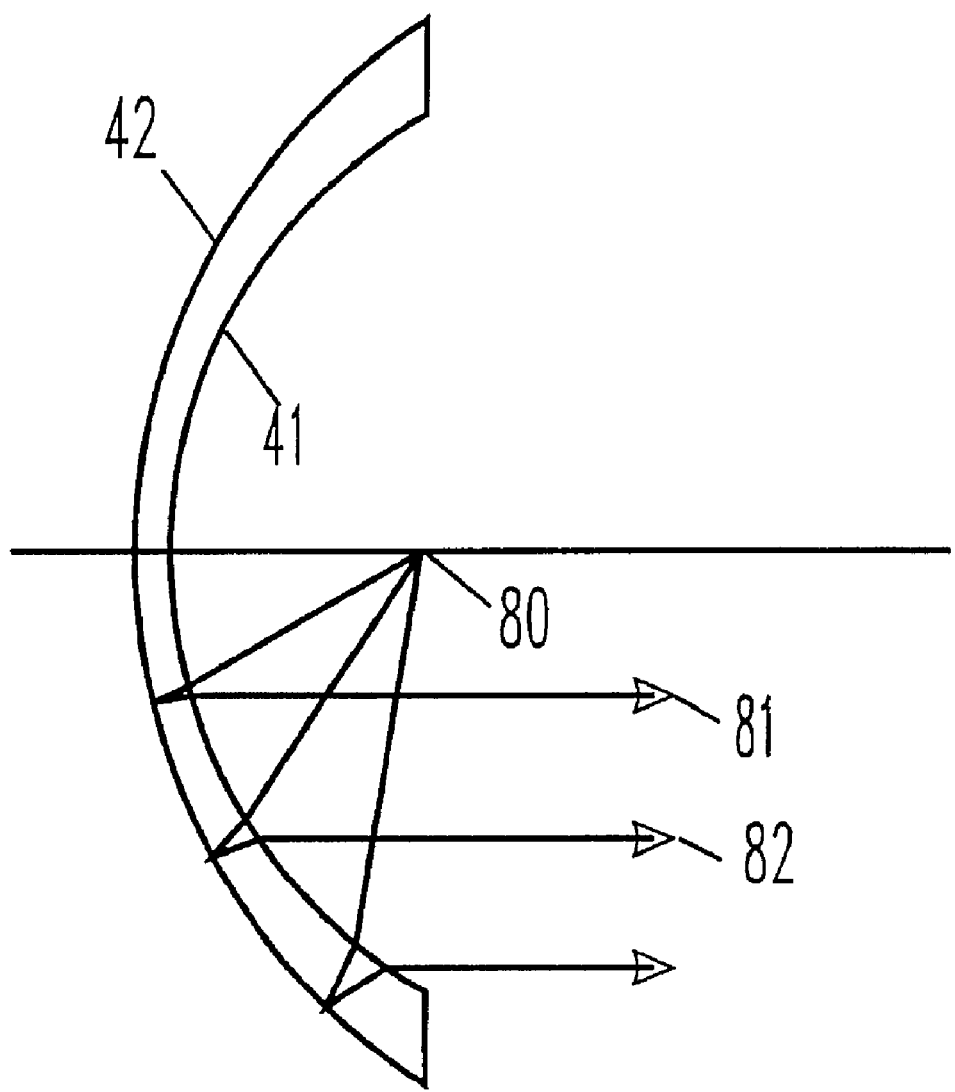
FIG. 7 shows principles of a Mangin mirror.
Figure 8:
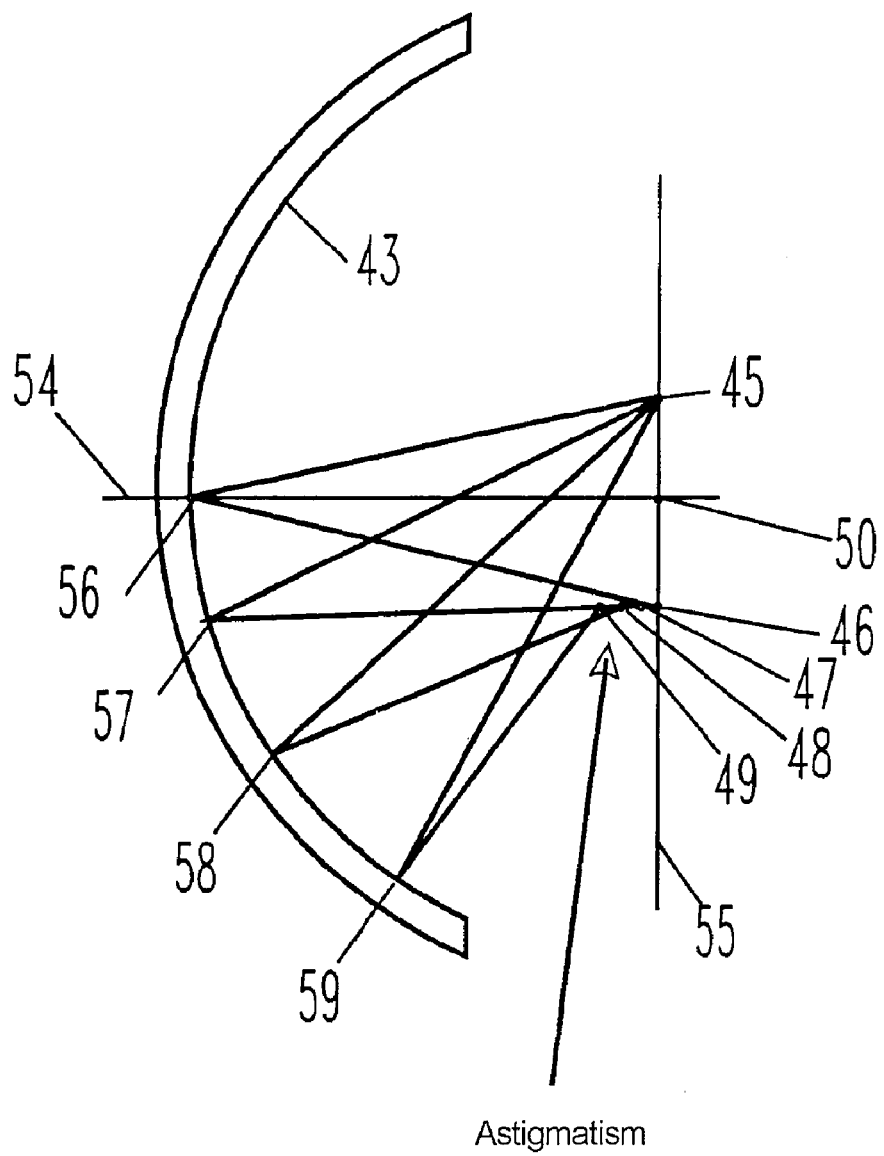
FIG. 8 shows the effects of astigmatism on a normal concave spherical surface of revolution.

FIGS. 6, 7 and 8 show how the two surfaces of revolutions 41 and 42 correct the aberrations of an optical system. In FIG. 7, a standard Mangin mirror is depicted. The Mangin mirror has two different spherical surfaces of revolution, having a convex spherical curve of a longer radius 42 than the concave spherical curve 41. The concave surface 41 acts as a corrective lens, refracting the light rays to form collimated beams 81 and 82 from a light source at the focal point of the system 80. The example shown uses two spherical curves to replicate a function of a single parabolic surface of revolution.

In FIG. 8, a single spherical surface of revolution mirror is depicted with the curve and the reflective coating on the concave surface 43. The light emanating from a point 45 offset from the center of curvature 2 times focal length 50 is reflected off the spherical surface 56 and focuses at a point 46. The light striking other points on the spherical surface 57, 58, and 59 focuses at slightly different points in space 47, 48, and 49. This is a natural phenomenon of a spherical imaging system, and the phenomenon is called astigmatism. Astigmatism, may cause significant eyestrain when viewing a system for an extended period of time.

Figure 9:
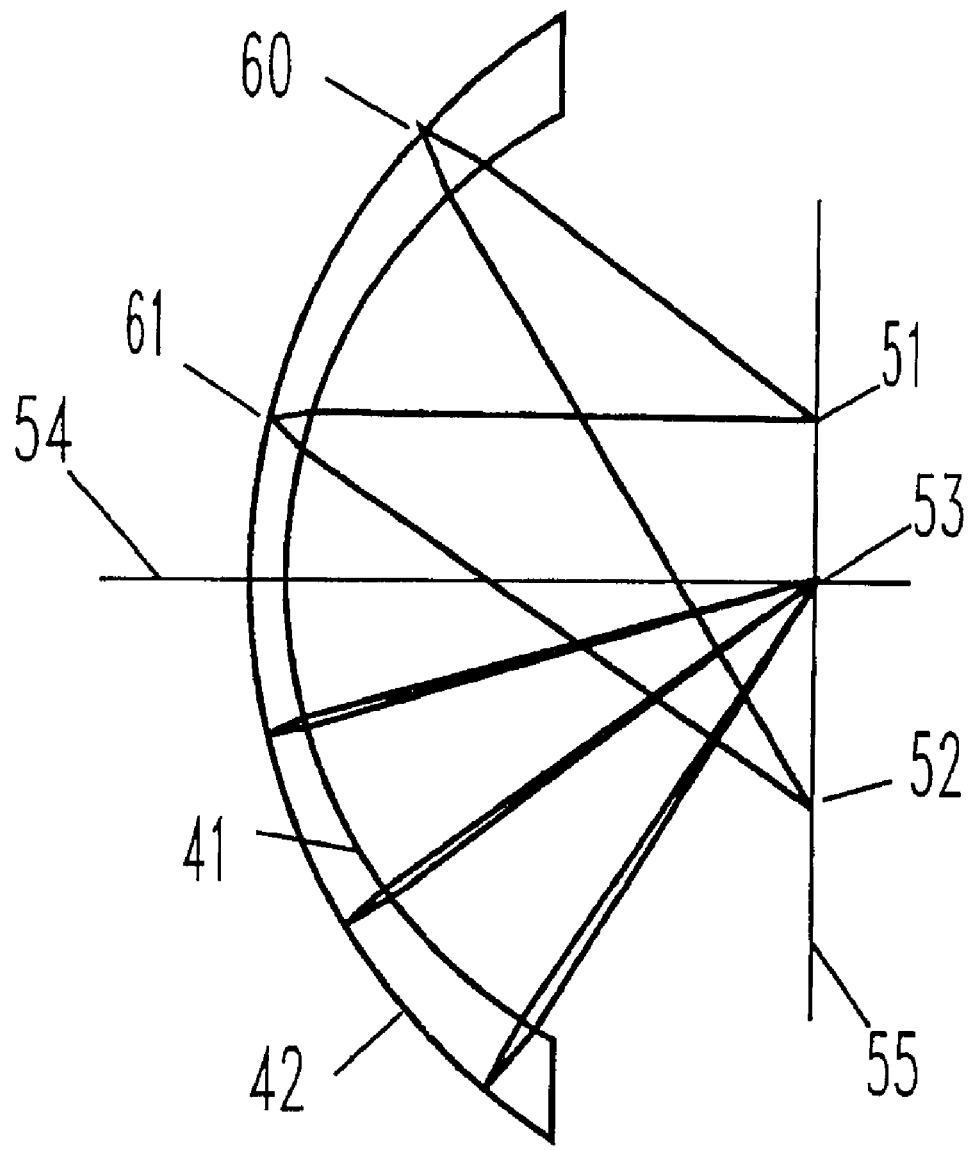
FIG. 9 shows how the Mangin mirror corrects astigmatism.

Since a small real image projection system is normally viewed up close, astigmatism is a significant problem. One method of rectifying astigmatism is to incorporate a corrective lens in the optical path to redirect the reflected rays to a common focus point. The present invention uses a variation of the Mangin mirror concept to correct the aberrations and astigmatism. Just as the Mangin mirror illustrated in FIG. 7, the Mangin mirror is able to refract the light waves into a collimated beam, and the dual surface mirror of the present invention as described herein is able to refract the light beams passing through the mirror substrate and correct the astigmatism of the system. Unlike the Mangin mirror, two spheres would not be effective. However, as shown in FIG. 9, an aspheric surface of revolution on the concave surface 41 can be designed to refract the reflected light rays 60 and 61 to a common focal point 52. In most cases, the corrections can be incorporated into one aspheric surface of revolution on the concave surface 41, such that that a standard spherical surface of revolution can be used for the convex reflective surface 42. In a system such as a video game application where the real images typically are viewed for a relatively long period of time, it may be necessary to incorporate the aspheric surfaces of revolution on both the convex 42 surface and the concave 41 surface so as to create a real image with minimal aberrations. Thereby, it is possible to view the real images without eyestrain for an extended period of time.

Figure 10:
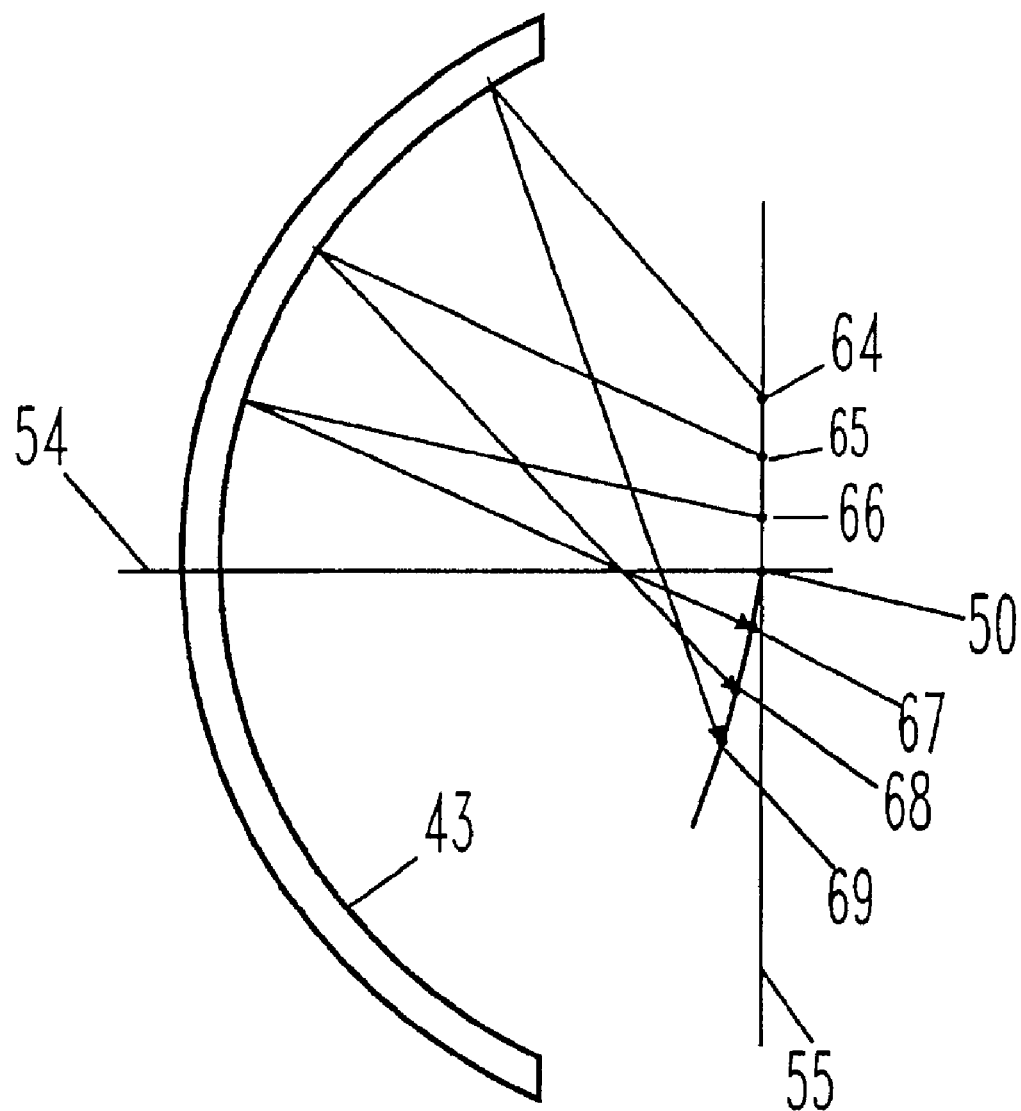
FIG. 10 shows effects of spherical aberrations and field curvature distortion, when imaging at a point other than the center of the mirror's radius.

FIG. 10 shows the effects of field curvature distortion on a real image. This is a natural phenomenon occurring in spherical optical devices and visual display systems, and there is no practical way to correct the phenomenon without using an array of corrective lenses. In a commercial real image display system, this is neither practical nor cost effective. When imaging a point 64, 65, and 66 offset from the curved mirror's optical axis 50, the focal points, or points of real image formation 67, 68, and 69, are not on a straight line or on a plane 55 with the image source points 44, 45, and 46. The effects of field curvature distortion are that the object being imaged is slightly curved and magnified near the center of the image. The center of the real image projects farther out from the device than the edges of the image 69.

Figure 11:
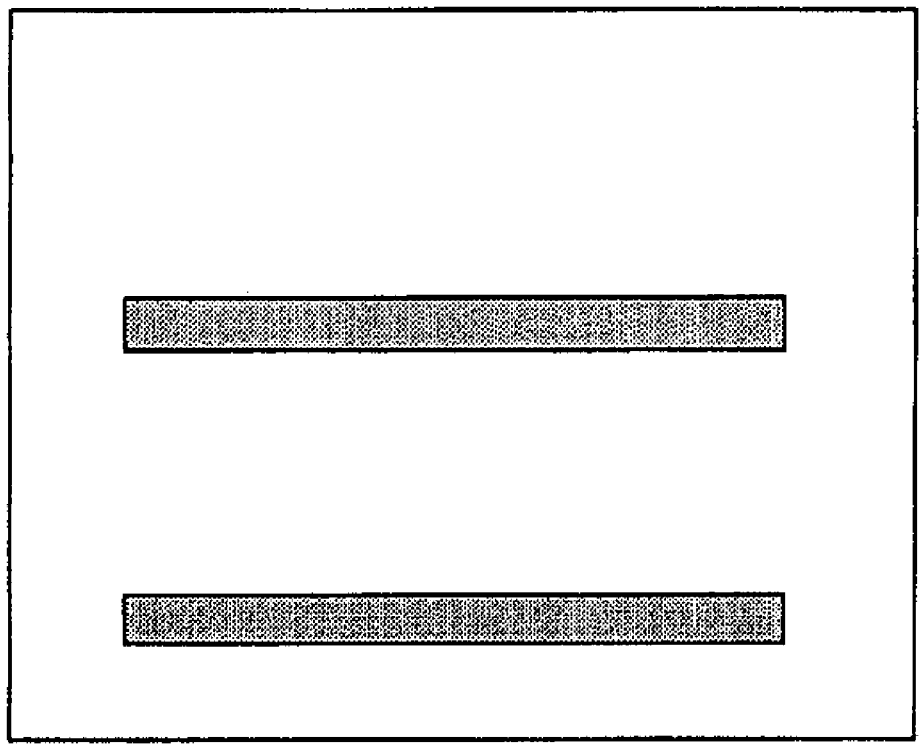
FIG. 11 shows an example of an image on a normal monitor.
Figure 12:
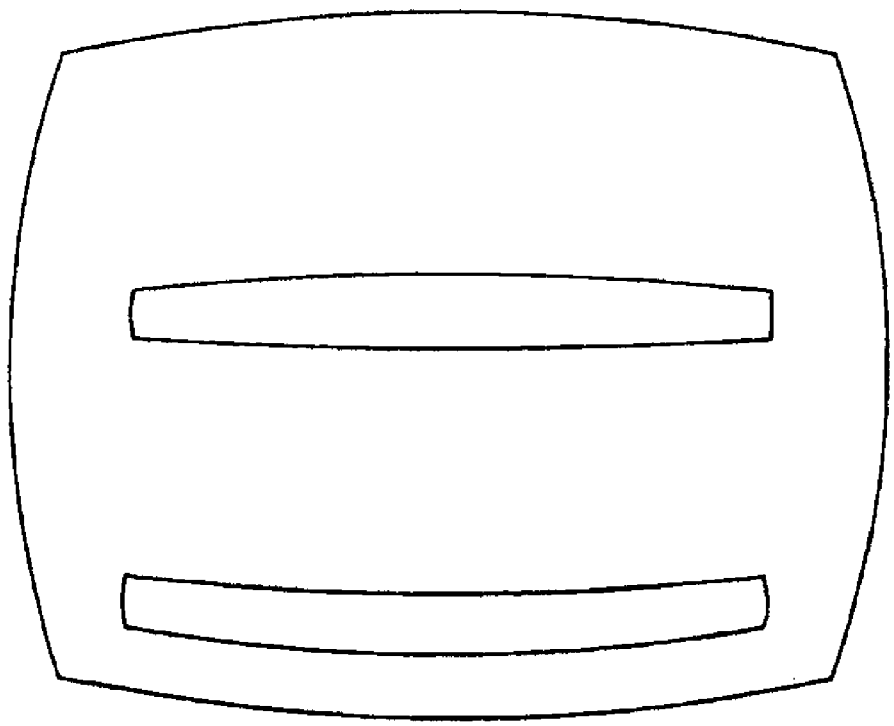
FIG. 12 shows an example of the effect of field curvature distortion on the image created from the target monitor depicted in FIG. 11.

In FIGS. 11 and 12, the effects of field curvature distortion are depicted. FIG. 11 shows a normal CRT screen image displaying two rectangles. FIG. 12 shows the resulting real image created by the system, and the effects of field curvature distortion on the real image. The rectangles are slightly curved and are magnified in the area near the center of the screen.

Figure 13:
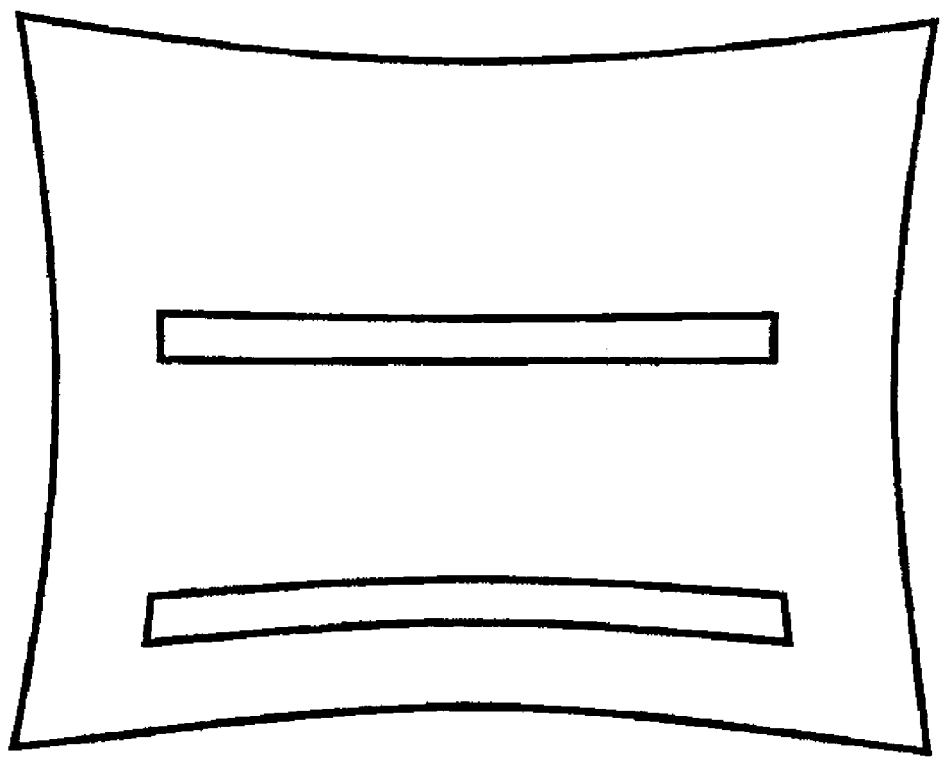
FIG. 13 and FIG. 14 show how a pin-cushioned scene on the monitor or target counteracts the effects of field curvature distortion.
Figure 14:
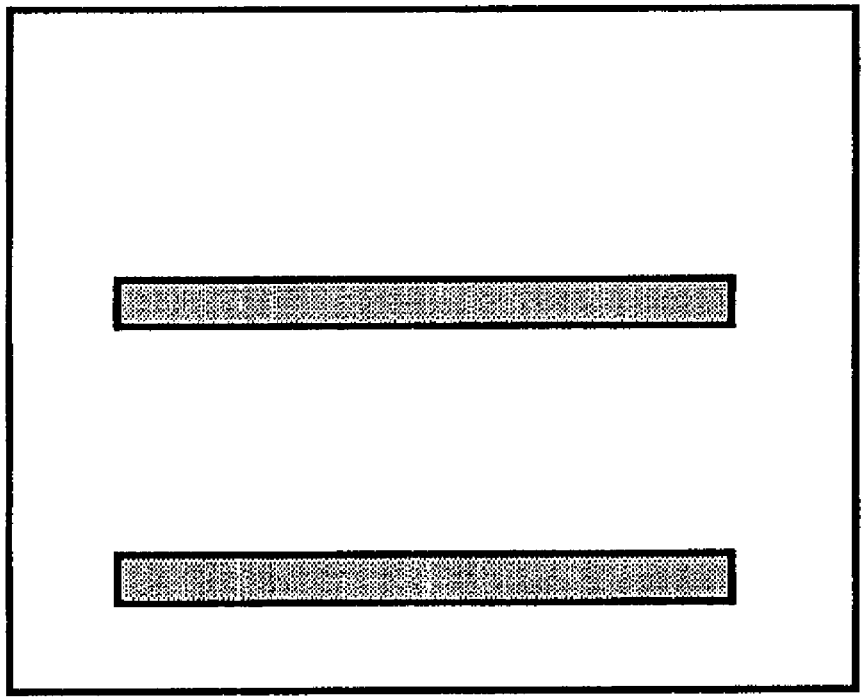

Creating a condition called "pin-cushion" on the CRT screen can compensate for the effects of the field curvature distortion. This can be done either electronically or by distorting the image using software. In a spherical mirror system, the distortion is reasonably symmetrical and round because of the spherical surface of revolution. The CRT can be adjusted to create a "pin-cushion" image, as shown in FIG. 13. The resulting image shown in FIG. 14 is a result of correction through field curvature distortion, thus compensating for the distortion.

Figure 15:
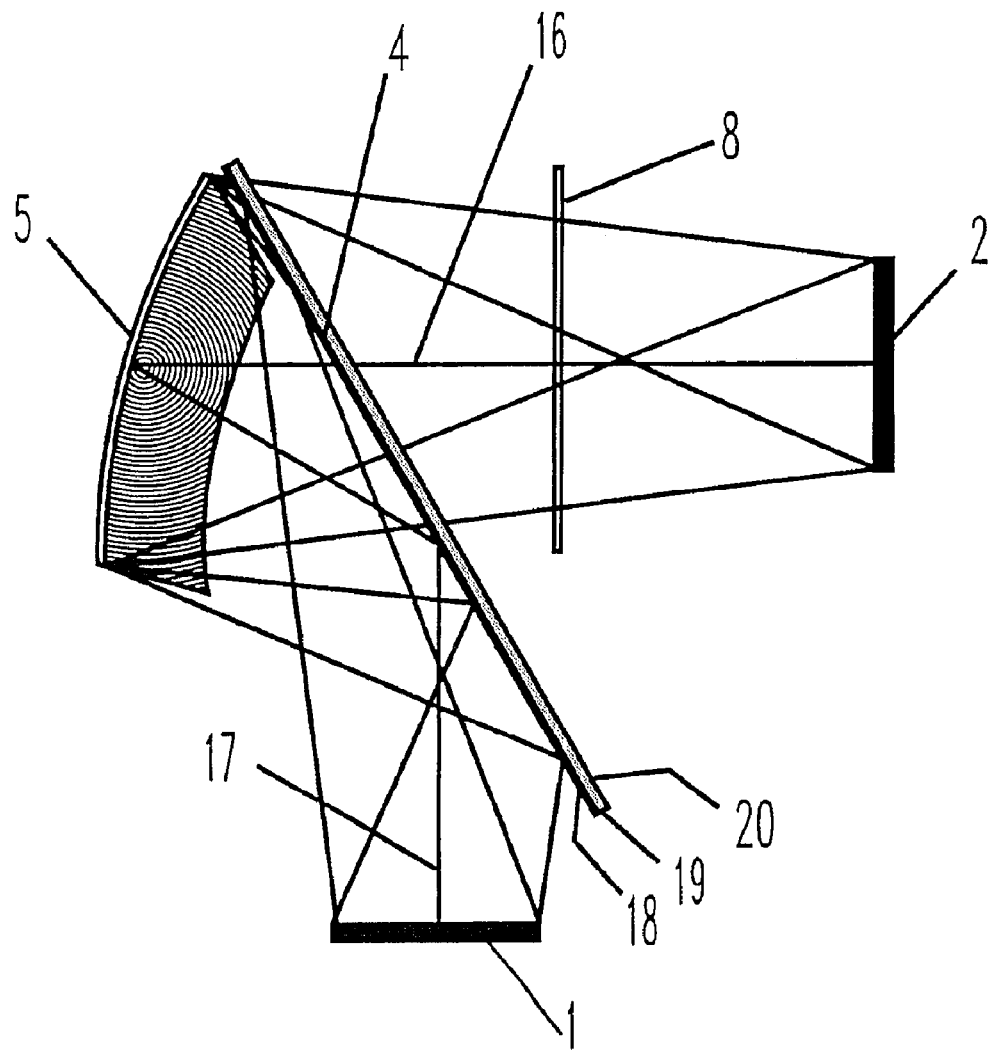
FIG. 15 shows a neutral density beamsplitter used in a tilted off-axis system of the present invention.

The neutral density window of FIG. 3 has another possible variation when using a different optical configuration. In FIG. 15, the curved mirror 5 is positioned along the viewing axis 16 rather than along the target axis 17. In this configuration, the beamsplitter coating 18 is applied to a neutral density glass 19 or a substrate. The beamsplitter coating 18 is applied to the beamsplitter 4 surface facing the curved mirror 5. The light from the target object 1 reflects off the beamsplitter coating 18 without passing through the neutral density material 19. The light from outside of the system passes through the neutral density material twice, and therefore the intensity of the ghost imaging light beam is significantly reduced.

Figure 16:
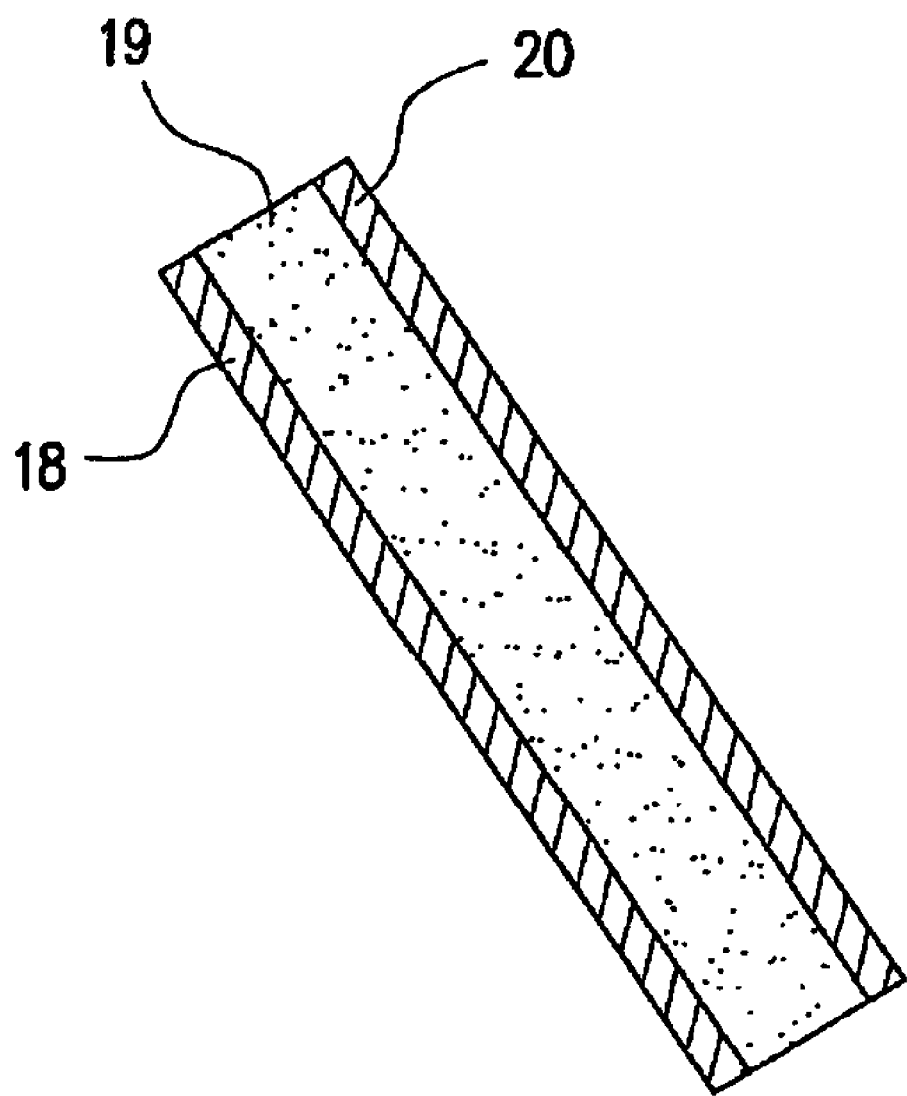
FIG. 16 shows an optional neutral density coating on the back surface of the beamsplitter.

FIG. 16 shows a variation of the neutral density beamsplitter, whereby a neutral density coating 20 is applied to the surface of a clear substrate 19 and a beamsplitter coating 18 is then applied to the opposite surface. In either configuration, an anti-reflective coating optionally is applied over the neutral density coating 20 or on the side of the neutral density substrate 19 opposite to the beamsplitter coating 18.

Figure 17:
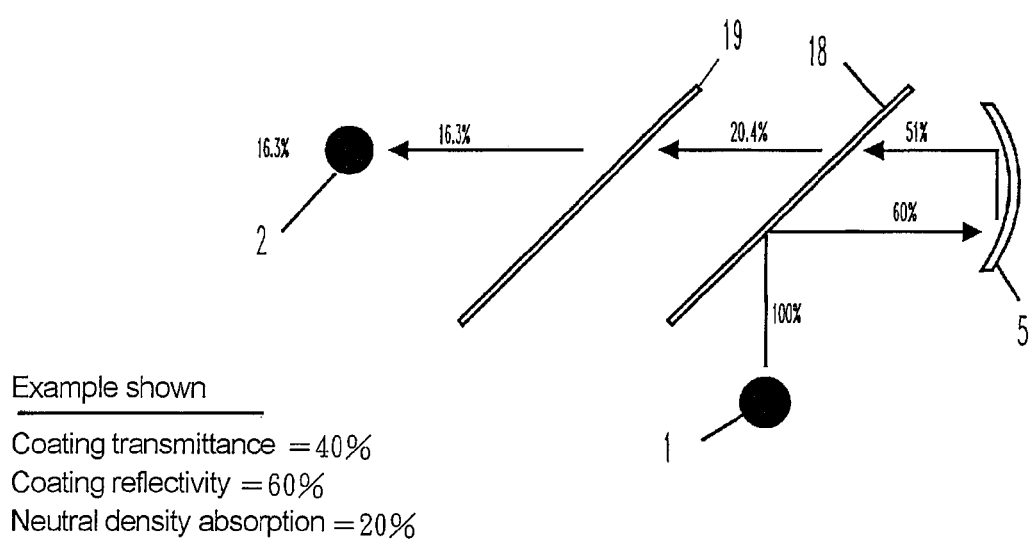
FIG. 17 shows the imaging beampath of the tilted-neutral density system and corresponding transmittances for the components.

FIG. 17 shows the transmission characteristics of a system using a 20% absorptive neutral density substrate 19 beamsplitter, a 60% reflective/40% transmissive beamsplitter coating 18, and an 85% reflective curved mirror 5. The resulting real image 2 intensity is 16.3% of the original object's 1 light intensity.

Figure 18:
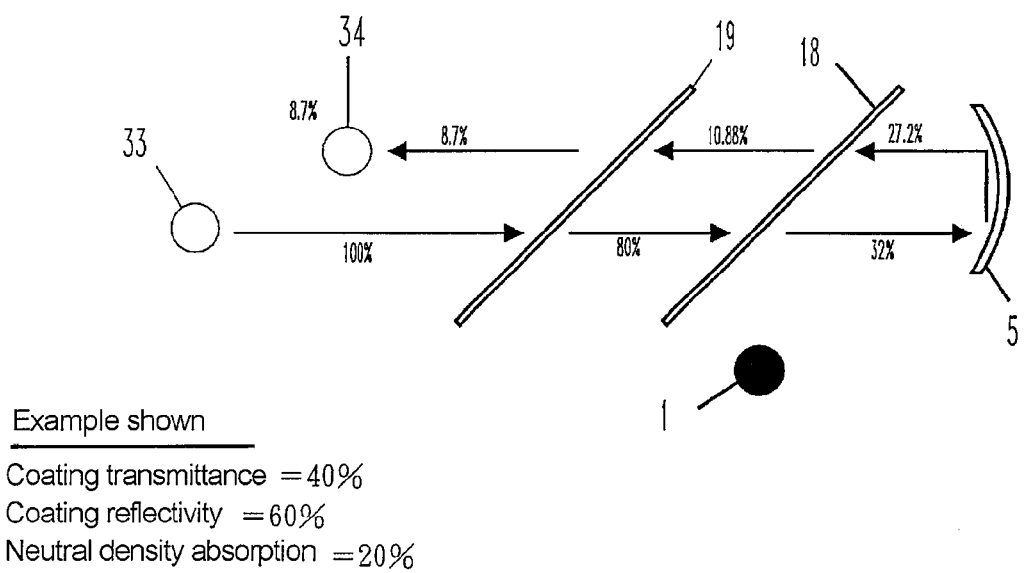
FIG. 18 shows the ghost beampath of the tilted-neutral density system and corresponding transmittances for the components.

FIG. 18 shows the transmission characteristics of the ghost imaging light beam emanating from outside 33 of the same system depicted in FIG. 17. The ghost image 34 exits the system at an intensity of 8.7%, compared to 16.3% for the real image. The example shown includes a 60R/40T beamsplitter and a 20% absorptive neutral density beamsplitter. Other combinations offer different performance characteristics.

FIG. 19 is a chart of the effects of different combinations of the beamsplitter and neutral density absorption. As one will see from the chart, ghost reduction is achieved at the cost of image brightness, and a balance should be maintained based on the particular application. Another consideration as to the need for ghost reduction is the required view angle. The tilted mirror system totally eliminates ghost imaging when viewed within a reasonable angle of incidence vertically. Ghost imaging is only visible when viewing the system from below the normal view axis.

Figure 20:
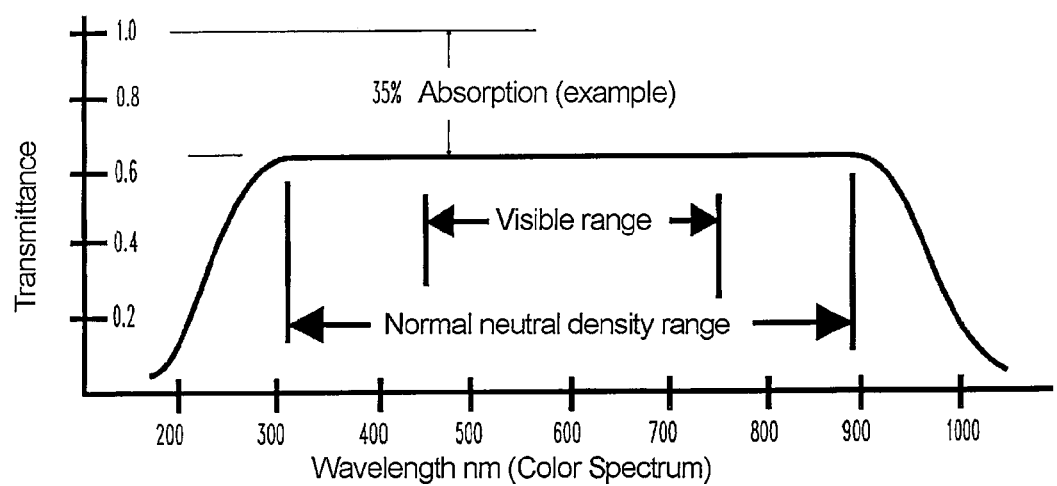
FIG. 20 shows a spectrograph of a neutral density material used in the system of the present invention, and the relatively even transmittances across the visual color spectrum.

FIG. 20 shows a spectrograph of a neutral density window having 35% absorption. The absorption is relatively uniform across the visible color spectrum and begins to drop off in the UV and IR range. The value of the neutral density window is that all colors are absorbed uniformly across the visible spectrum, and therefore the real image is a true-color replication of the original object.

In addition to small displays, the real image projection system of the present invention can also be applied to an Ultra-High-Bright (UHB) display system, so as to improve imaging and reduce ghost.

The UHB display system provided in the present invention includes a tilted mirror. An embodiment of the system of the present invention comprises a single curved reflector tilted at approximately 15 degrees off-axis. The tilted angle must be sufficient to allow the diverging beampath to strike the curved reflector without intersecting the area of the viewing window aperture. The tilted angle preferably should be less than 17 degrees so as to minimize the effects of field curvature in the optical system. As the tilted angle exceeds 17 degrees, the distortion caused by field curvature phenomena becomes critical. In one embodiment, the light beam from a CRT or a target object located directly below the curved reflector and facing forward strikes a fold mirror or flat reflective surface positioned directly below the viewing window aperture with the reflective surface facing the target and the curved reflector. Preferably, the fold mirror is positioned at an angle so that the light beam from the monitor is reflected to the center of the curved reflector at an angle from horizontal equal to twice the tilted angle of the curved reflector. The diverging light beam reflects off the curved reflector and the converging beam exits on a horizontal axis, forming the real image at the focal point of the system. Because the system uses no beamsplitter, the system transmission is approximately 56% when used with a 70% Neutral Density Filter Window and 80% when used with no front window.

Figure 21:
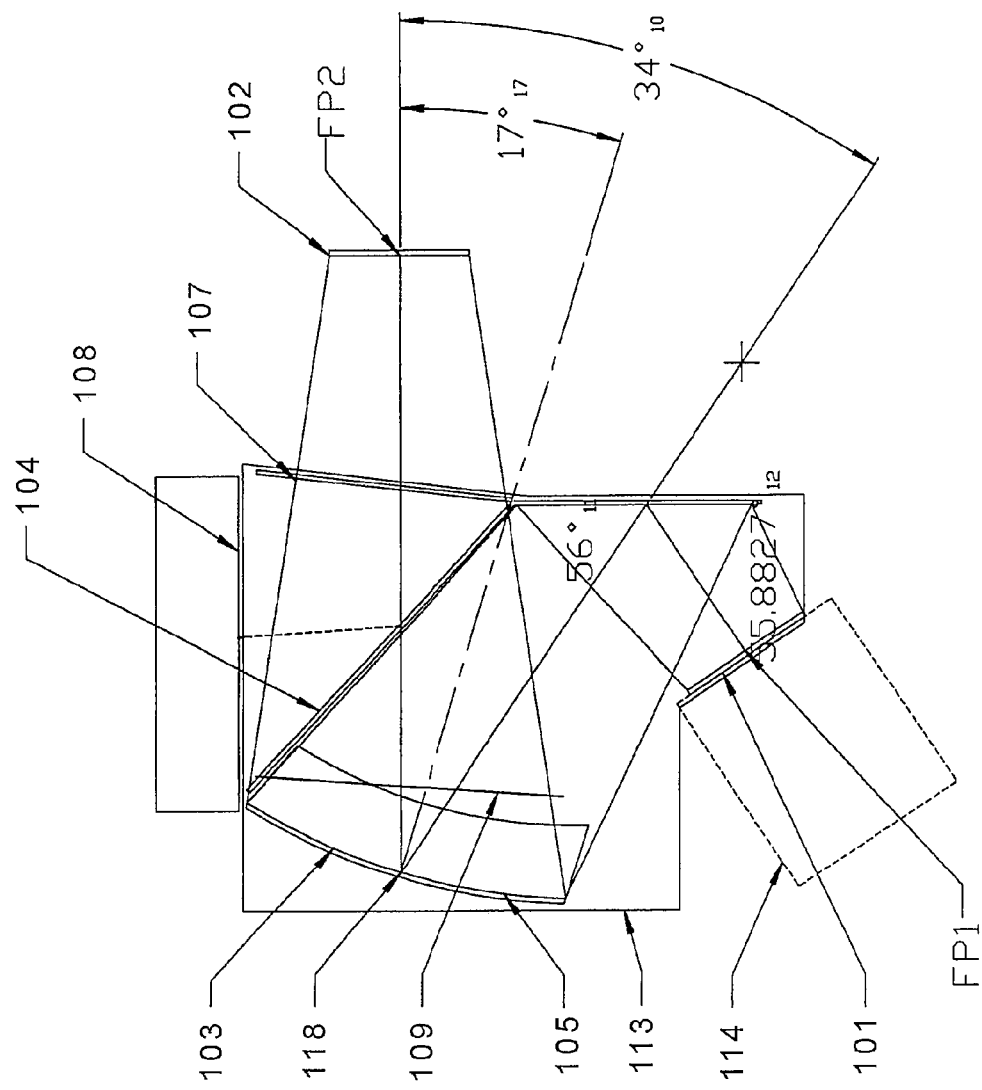
FIG. 21 is a side view of a preferred embodiment of the present invention, showing a tilted curved reflector, and a high transmissive beamsplitter with the background image source located overhead.

Referring now to FIG. 21, the target 101 may be a real object, an LCD, a CRT 114, or any object that transmits, reflects or emits a light beam. The light from the target object 101 reflects off of a fold mirror 106 at a complementary angle 112 and 111 to the curved reflector 103 where it again reflects off of the coated surface 105 of the curved reflector 103. The curved reflector 103 is positioned so that the beampath reflected form the fold mirror 106 strikes the curved reflector 103 at the physical center 118 or the vertex of the curved reflector 103. The reflected angle 110 of the light beam reflecting off of the curved reflector surface 105 is equal to twice the tilted angle 117 of the curved reflector 103. The imaging beam then passes through the beamsplitter 104 and then through the window 107, forming an image at the imaging focal point FP2 of the system. In a one-time magnification system, the beampath distance between the target focal point FP1 and the optical center 118 or the vertex of the curved reflector surface 105 is equal to the radius of the curved reflector, or equal to two times the EFL focal length. The image is then formed at the imaging focal point FP2 at a beampath distance also equal to the radius of the curved reflector 103. The background image target 108 is positioned over the beamsplitter 104, so that the virtual image 109 of the background target 108 appears to be in front of the curved reflector 103 located at inside of the housing 113. The beamsplitter 104 should have a higher transmission than reflection. Optimum transmission T % and reflection R % is about 96% T/4% R. However, other combinations will function satisfactorily as well.

Figure 22:
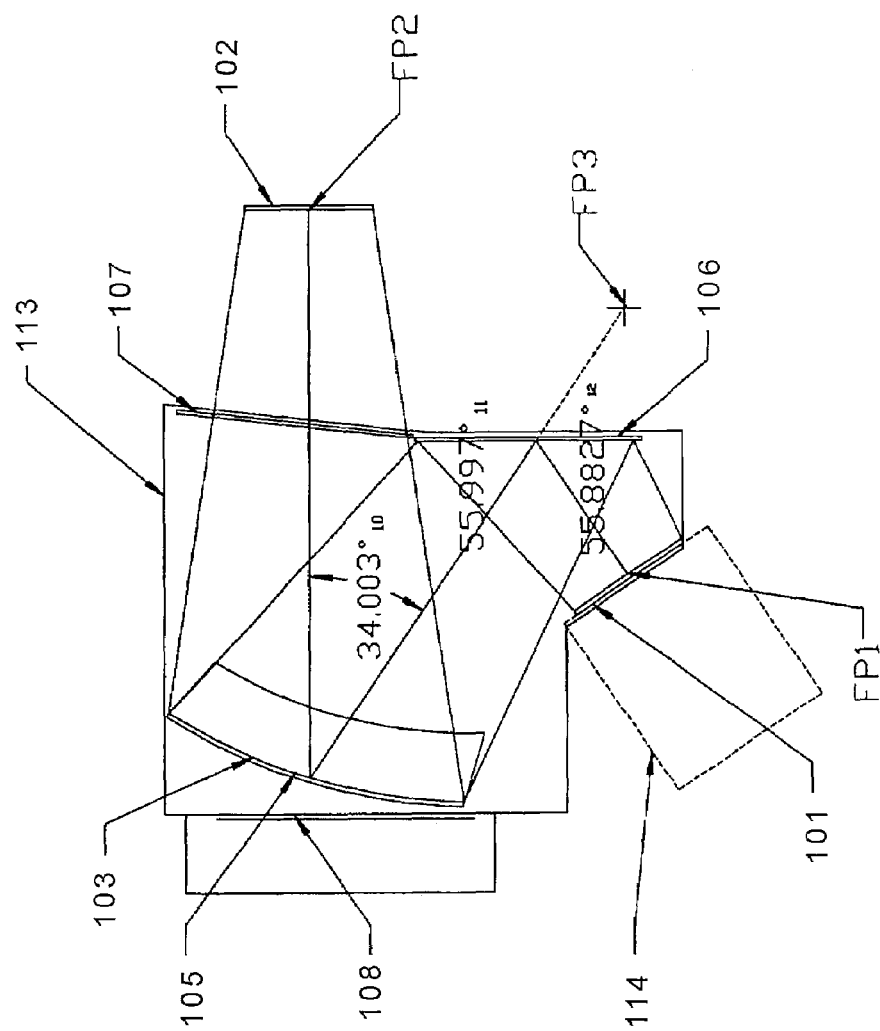
FIG. 22 is an alternate embodiment to that of FIG. 21, showing the tilted curved reflector with a beamsplitter coating, in which the background image is visible through the curved beamsplitter, thus eliminating the need for an additional tilted flat beamsplitter.

FIG. 22 shows essentially the same configuration as in FIG. 21, except the curved reflector 103 is coated with a beamsplitter coating or a semi-clear mirror coating 105. The reflective coating is preferably on the concave surface of the reflector, but optionally on the convex surface. If the convex surface is reflectively coated, the concave surface optionally has an anti-reflective coating applied to reduce secondary ghost imaging, for example. As shown in FIG. 22, a second image source or a background image source 108 is located behind the curved reflector 103 and is visible through the reflector 103, so as to allow the second image source to be visible to the viewer while simultaneously viewing the real projected image 2. This second image source is optionally a virtual image, a real image, or an infinity image, i.e. collimated light projecting an image at infinity, as well as an actual object, a monitor 114, a projector, a projection screen, or the like. The disadvantage of using a beamsplitter coating is that the brightness of the real image 102 is reduced because the beamsplitter coating has a reflectivity of approximately 74%, as compared to 86% for the aluminum coating in the standard system.

Figure 23:
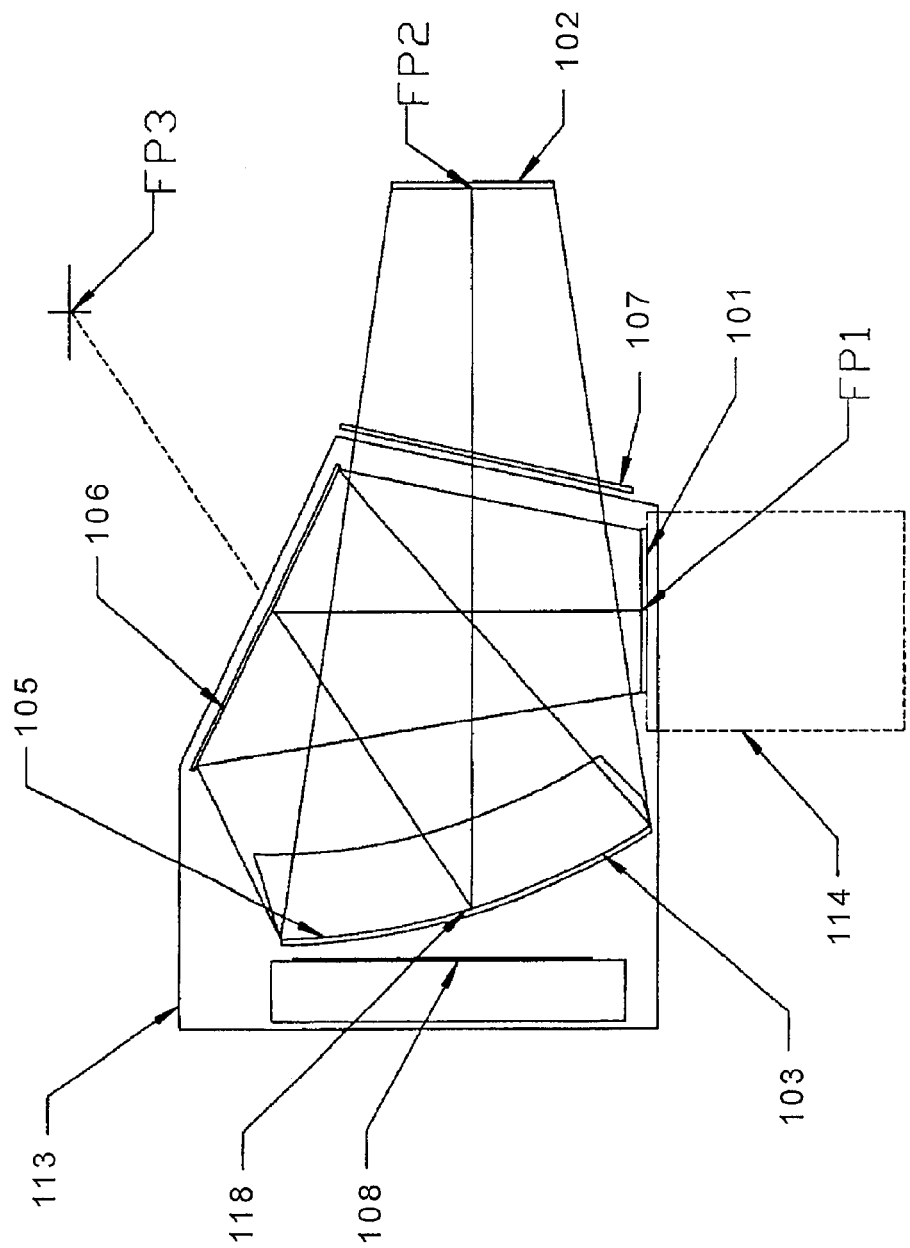
FIG. 23 is an alternate embodiment to that of FIG. 21, including the tilted curved reflector and a fold mirror that diverts the input beampath at an angle near 90 degrees from the imaging axis, in which the curved reflector may be a beamsplitter coating to allow the use of a secondary background image.

FIG. 23 shows an alternate configuration of the system. In this system, the fold mirror 106 is positioned at an angle, such that the diverging beampath from the target 101 focal point FP1 to the fold mirror 106 crosses the imaging beampath from the vertex or the optical center 118 of the curved reflector 103 to the imaging focal point FP2 where the real image 102 is formed. The diverging beampath from the target focal point FP1 strikes the fold mirror 106 which is positioned at an angle, so that the reflected beampath is directed to the optical center 118 on the curved reflector 103. This system allows an extremely compact footprint.

When a secondary background image 108 is required, the curved reflector 103 is coated with a beamsplitter coating 105, so that the background target 108 is visible through the curved reflector. The background image source 108 may be the actual object, the monitor 114, the projector, the projection screen, or anything that reflects, transmits, or emits the light beam, including a gas plasma or an LCD screen showing the real-time video. The beamsplitter coating 105 applied to the curved reflector 103 should have a higher reflection than transmission. With a bright background source 108, the optimum beamsplitter coating 105 may be a 74% reflective, 12% transmissive aluminum coating. However, any beamsplitter coating including multi-layer dielectric coatings are acceptable as well.

Figure 24:
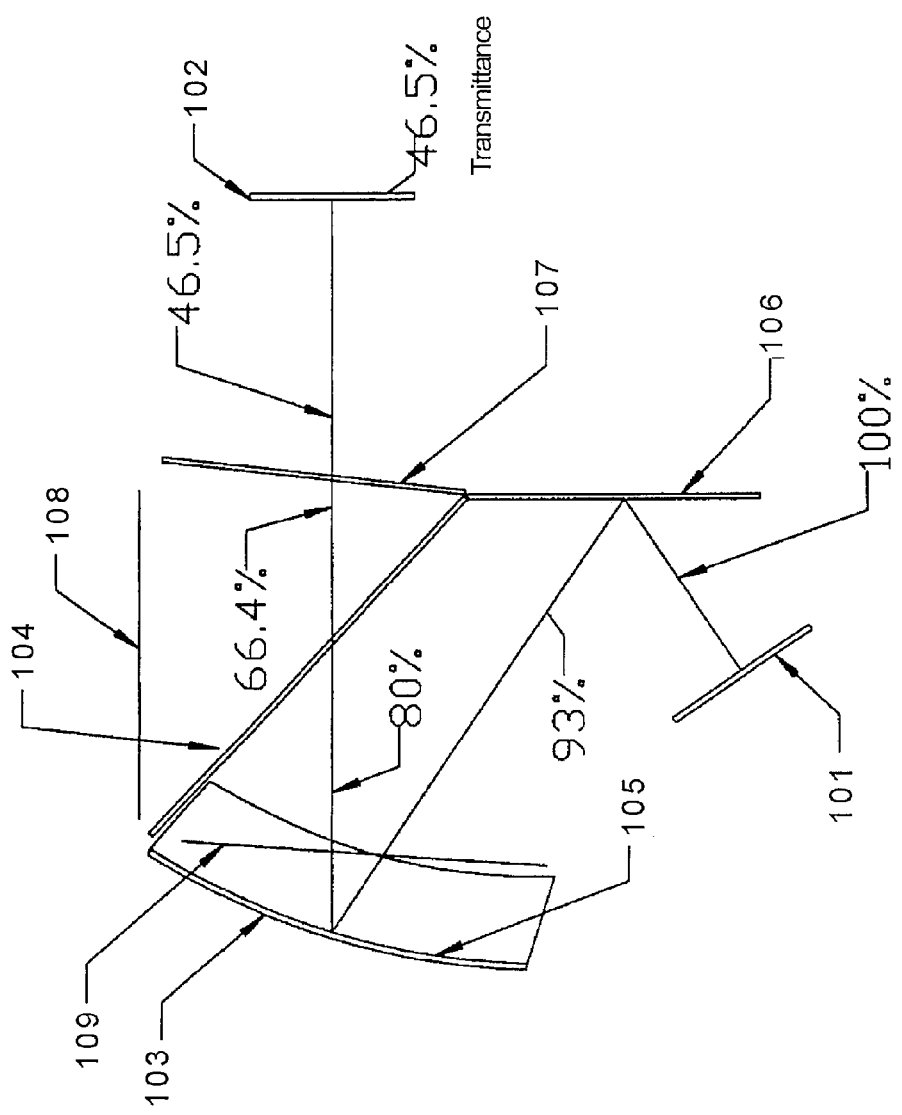
FIG. 24 is a beampath ray-trace layout of the UHB invention, showing the transmission characteristics of the system depicted in FIG. 21.

FIG. 24 shows an example of typical transmission characteristics of the system depicted in FIG. 21. The light from the target object 101 is projected at 100% brightness. The beampath reflects at 93% brightness (100% times 93%) off of the fold mirror 106 which is coated with a 93% reflective enhanced aluminum coating. The light beam then reflects off of the curved reflector 103 surface 105 which is coated with an aluminum coating ($AlSiO_2$), having an 86% reflection, resulting in a brightness of 80% (93% times 86%). The light beam is then transmitted through the beamsplitter 104 which is coated with an 83% transmissive/12% reflective coating. The resulting brightness is 66.4% (80% times 83%). The beampath is then transmitted through the window 107 which is a 70% transmissive neutral density filter. The resulting brightness of the light beam exiting the window 107 which forms the real image is 46.5% (66.4% times 70%), as compared to the original target 101 brightness of 100%. Other coating types and reflectivity are also acceptable.

The light from the background source 108 is 100% and reflects off of the beamsplitter coating 104 at 12%, forming the background image 109 which is 12% of the original background target 108 brightness. It is important to have the real image 102 brightness (46.5%) much greater than the background image 109 brightness 12%, so that the background is not visible through the real image in order for the real image 102 to appear solid and real. Another optional beamsplitter material would be clear glass which has a normal reflectivity of 4% with an antireflective coating applied to the opposite side resulting in 0.2% reflectivity. This would act as a 96% T/4% R beamsplitter, improving overall transmission of each of the systems.

Figure 25:
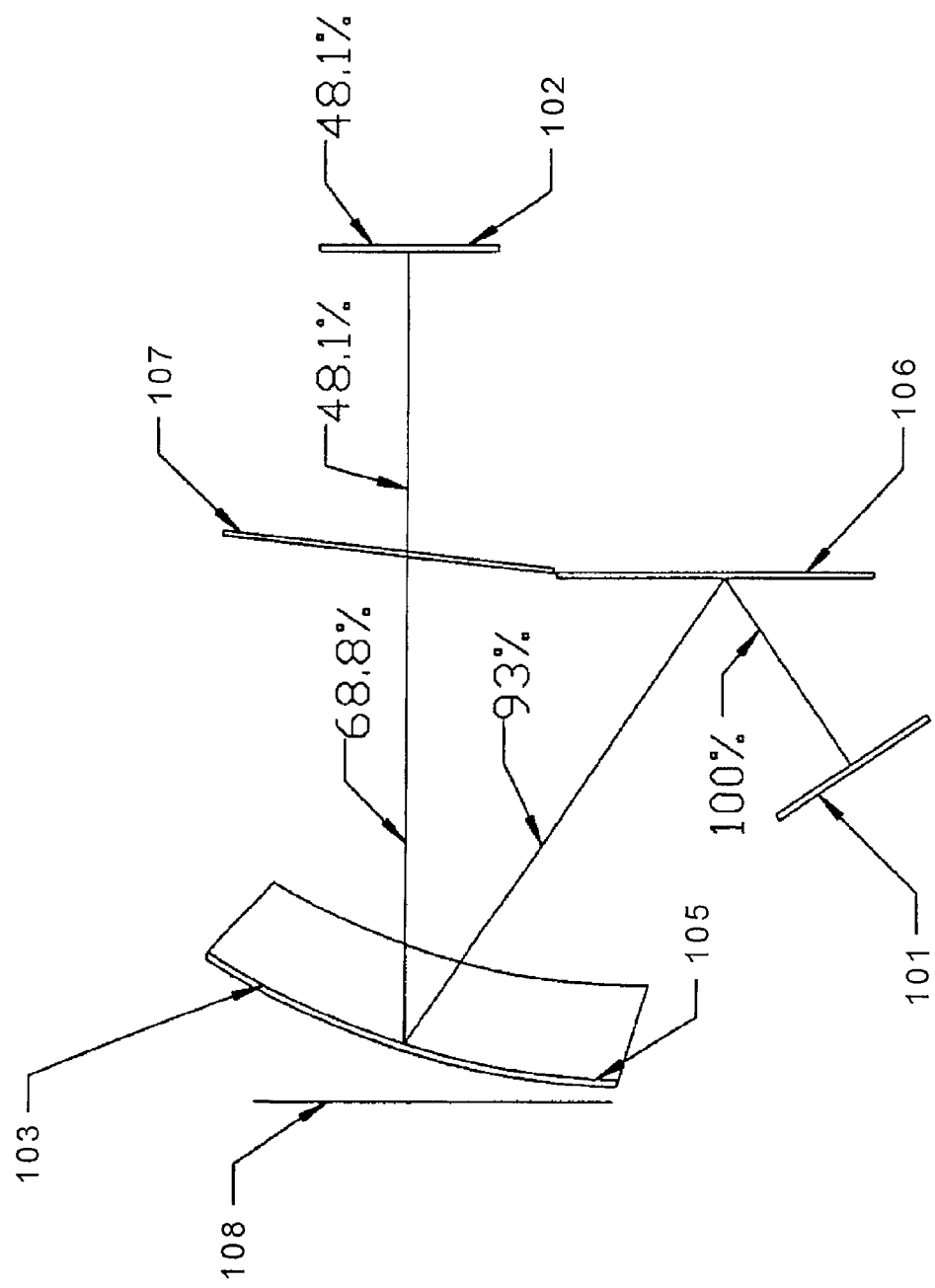
FIG. 25 is a beampath ray-trace layout of the invention, showing the transmission characteristics of the system depicted in FIG. 22.

FIG. 25 shows an example of typical transmission characteristics of the system depicted in FIG. 22. The light from the target object 101 is projected at 100% brightness. The beampath reflects at 93% brightness (100% times 93%) off of the fold mirror 106 which is coated with a 93% reflective enhanced aluminum coating. The light beam then reflects off of the curved reflector 103 surface 105 which is coated with a partially reflective aluminum coating $AlSiO_2$ or the beamsplitter coating having an 74% reflection and 12% transmission, resulting in a brightness of 68.8% (93% times 74%). The beampath is then transmitted through the window 107 which is a 70% transmissive neutral density filter. The resulting brightness of the light beam exiting the window 107 which forms the real image is 48.1% (68.8% times 70%), as compared to the original target 101 brightness of 100%.

The background image 108 is formed by directly viewing the background target 108 through the beamsplitter coating 105 applied to the curved reflector 103. The background image brightness is 12% (100% times 12%). If a background image 108 is not required in the system, an 86% aluminum coating 105 on the curved reflector 103 would result in the real image 102 brightness of 56%.

Figure 26:
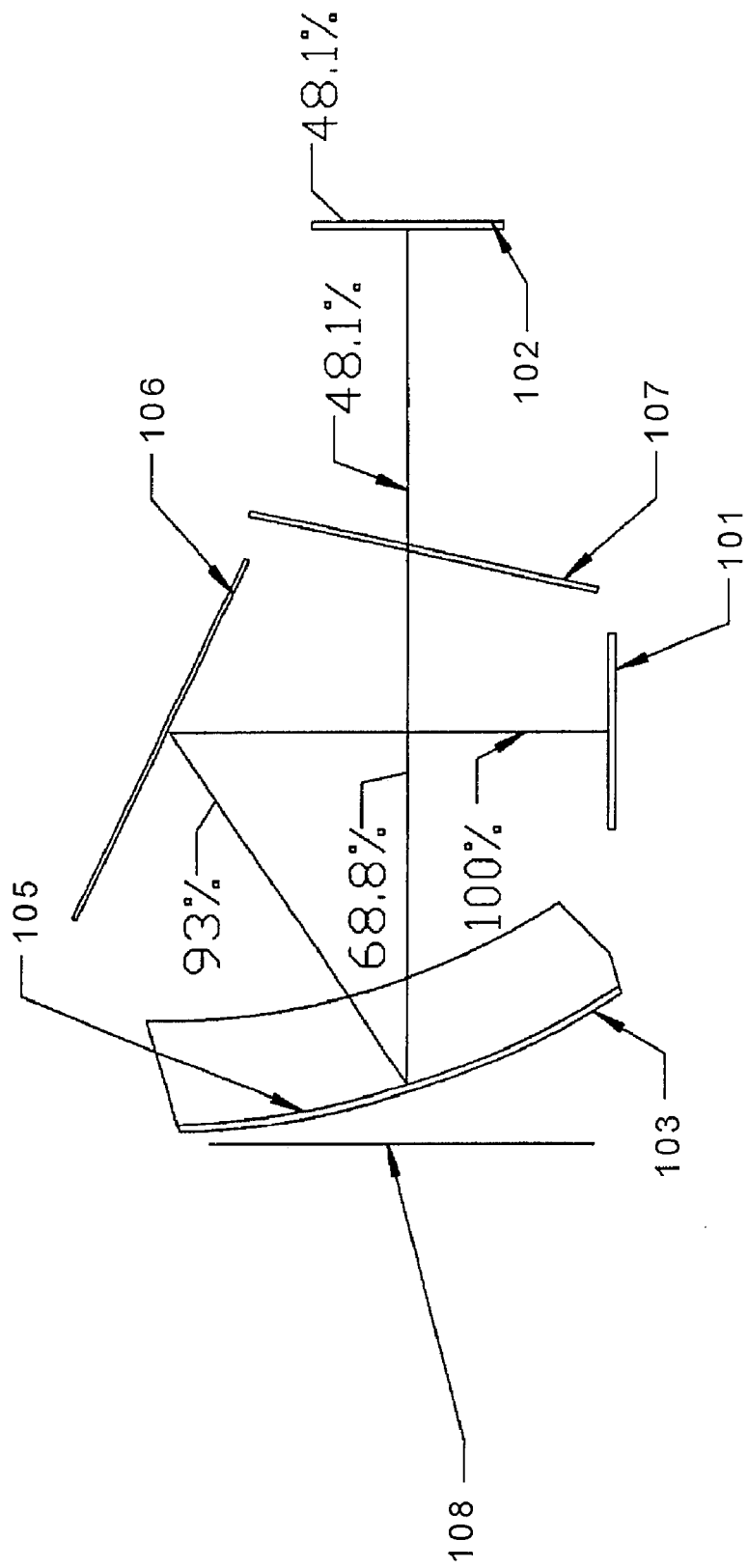
FIG. 26 is a beampath ray-trace layout of the invention, showing the transmission characteristics of the system depicted in FIG. 23.

FIG. 26 shows an example of typical transmission characteristics of the system depicted in FIG. 23. This configuration has an identical transmission characteristic as depicted in FIG. 25.

Figure 27:
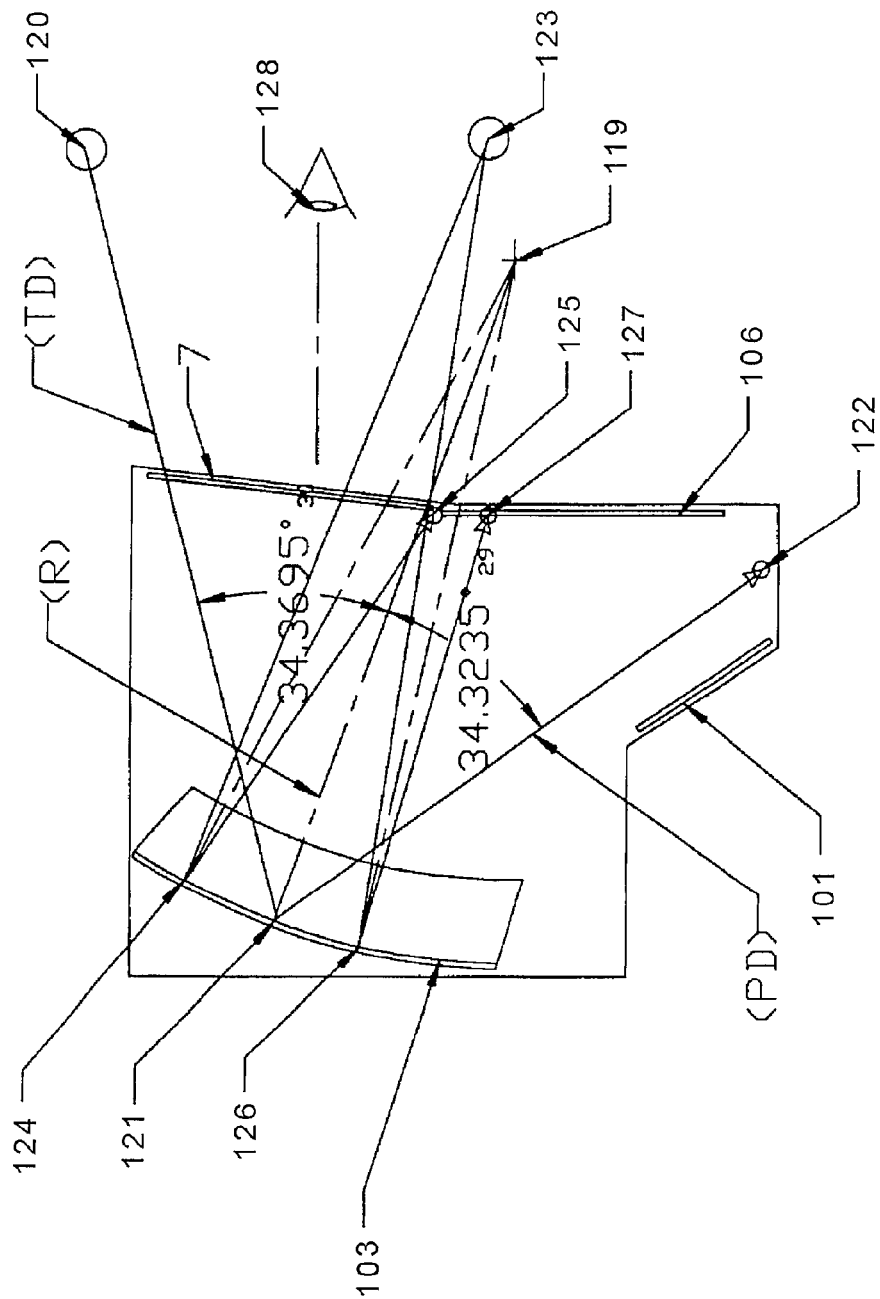
FIG. 27 shows the ghost reflection characteristic of the tilted system depicted in FIG. 21.

FIG. 27 shows the ghost image characteristics of the proposed systems depicted in FIG. 21. All systems shown in FIG. 21, FIG. 22, and FIG. 23 have similar characteristics. In FIG. 27, the light beam from an external source 120, such as the light beam in the room or a brightly lit object, enters through the window 107 and strikes the curved reflector 103. The light beam striking the surface 121 of the curved mirror 103 is reflected and forms an image along the line of the reflected beampath 120 and 122. The image is formed at a position 122 where the viewer 128 cannot see the ghost image 122 since it does not exit the window 107. Light sources even at low positions 123 within the room will reflect 126 off the curved reflector 103 and form an image 127 at a point within the system case 113 and will not exit the window 107. Therefore, the image is not visible to the viewer 128, and ghosting in the proposed systems is totally eliminated.

The following is a calculation method for determining positions and view angles of ghost reflections in the proposed system. To calculate the position of ghosting within a system, the following formulas apply.

To calculate the distance from the curved reflector surface 103 in which the ghost image 122 is formed:

PD=Projection Distance From Curved Reflector 121 and 122

TD=Target Distance From Curved Reflector 120 and 121

R=Mirror Radius or 2 times Focal Length or EFL 121 and 119. Therefore PD=1/[(2/R)−(1/TD)]

To calculate the angle at which the ghost image 122 is reflected off of the curved reflector 103:

TA=Target Angle 130 of the light beam from the target 120 to a point 121 on the surface of the curved reflector 103 relative to an imaginary line from the center of radius 119 of the curved reflector to the point 121 on the reflector surface where the beam strikes.

RA=Angle of Reflection 129 off of the curved reflector relative to the imaginary line from the center of radius 119 of the curved reflector to the point 121 on the reflector surface where the beam strikes.

TM=Angle of Tilt of Curved Reflector 103 relative to Vertical.

Therefore the angle of reflection RA+TA

Therefore angle of reflection compared to Horizontal=RA+TA+MA

As an example, the outside light source 120 enters the window at a downward angle of 15 degrees to horizontal. The axis 121 and 119 of the curved reflector 103 is tilted downward 15 degrees from horizontal. The target angle 130 of the outside light source 120 is 30 degrees from the axis 121 and 119 of the curved reflector 103. The light beam is reflected at a complimentary angle 129 of 30 degrees to the axis 121 and 119 of the curved reflector 103. The light beam therefore, is reflected downward at 45 degrees (RA+MA) or 30 degrees plus the mirror tilt of 15 degrees from horizontal.

Now assuming the radius of the curved reflector is 35" (R), and the outside light source 120 is located at 240 inches (TD) from the position where it strikes 121 the curved reflector 103, the ghost image 122 is formed at a distance of 18.9" (PD) from the reflection point 121 on the curved reflector 103, along the beampath defined previously between points 121 and 122 or 45 degrees downward from horizontal. This is calculated as follows, $$PD=1/[(2/R)-(1/TD)]$$

$$PD=1/[(2/35)-(1/240)]=1/[0.05714-0.00417]$$

$$PD=1/0.05298=18.876''$$

Figure 28:
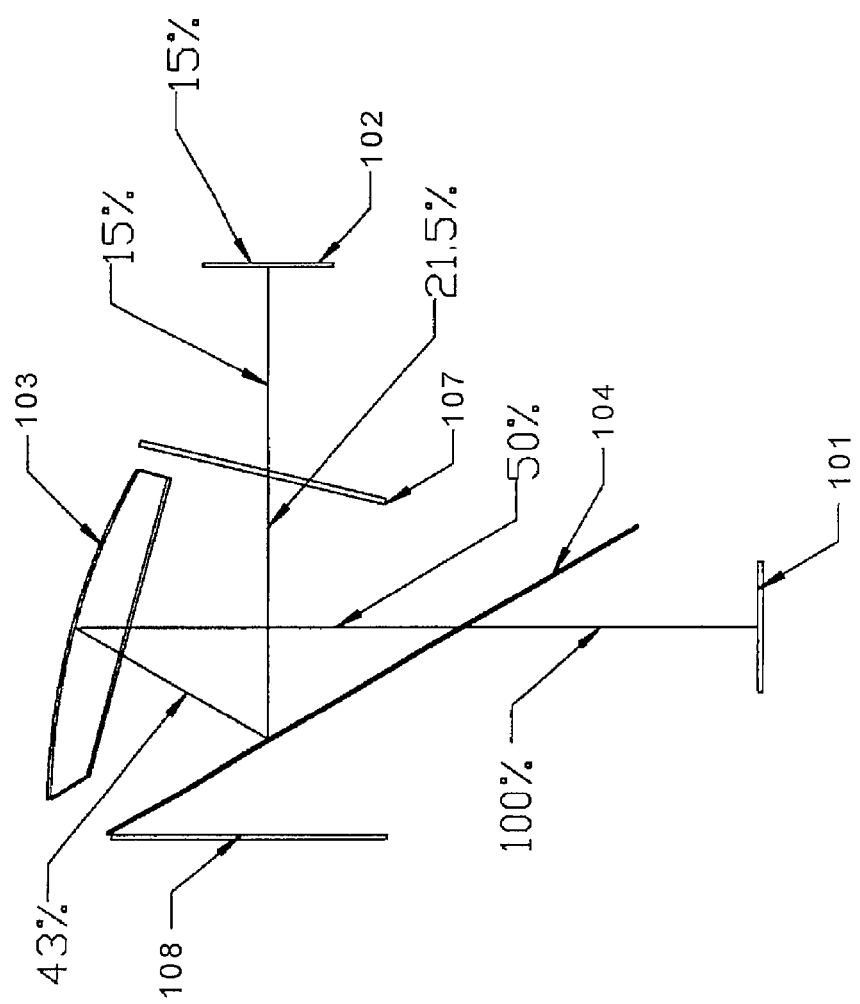
FIG. 28 shows a prior art tilted system using a tilted 50-50 beamsplitter and the transmission characteristics of the system.

FIG. 28 shows a prior art system using a tilted curved reflector. It has similar ghost reduction benefits as those shown in FIG. 27. However, the transmission of the system is 15% compared to 46.5% as depicted in FIG. 21 and FIG. 24, as used in the proposed invention.

Figure 29:
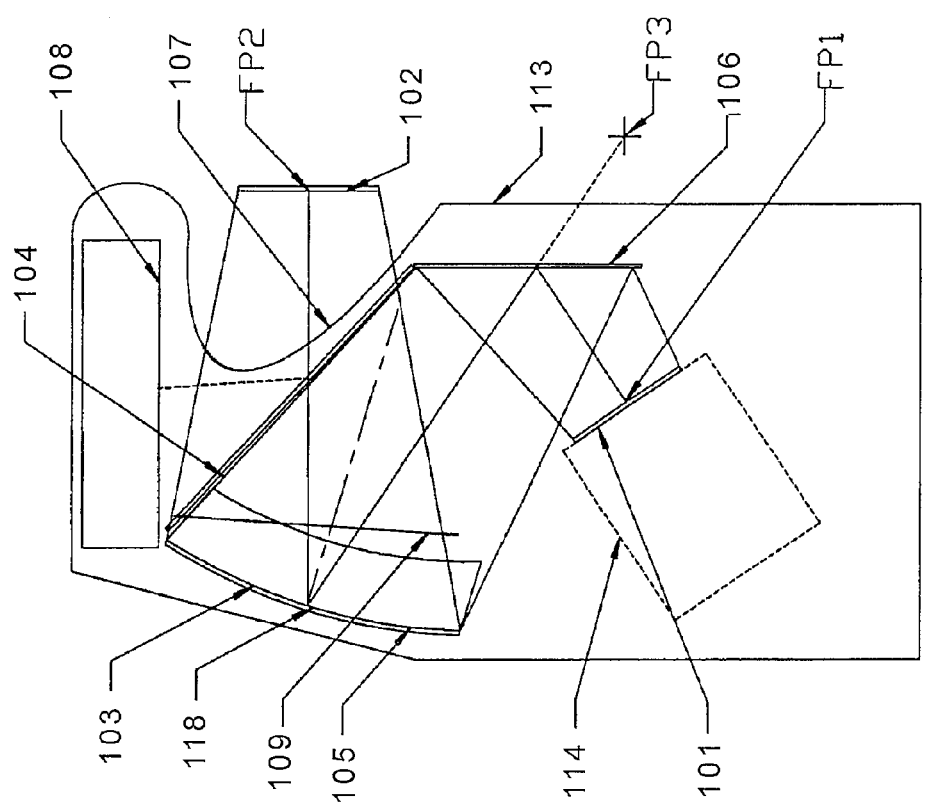
FIG. 29 shows an UHB system in a hooded enclosure that will reduce internal imaging of external light sources.

FIG. 29 shows the UHB system in an enclosure with a hooded top enclosing the background target source 108 and no front window 107. In the example shown, the light beam from the target source 101 monitor 114 reflects off the fold mirror 106 and strikes the curved reflector 103 centered at the vertex 118 or the physical center of the curved reflector 103. The light beam then passes through the beamsplitter 104 and forms a real image 102 at the focal point FP2 of the system. The beamsplitter 104 in the system acts as a front window to the system and the upper sides 107 of the cabinet 113 are recessed back to enhance the 3D effect. The system can be de-magnified by moving the real image target monitor 101 off the focal point FP1 and increasing the beampath length from the target 101 to the vertex 118 of the curved mirror 103 as compared to the beampath length between the focal point FP1 and the vertex 118 of the curved reflector 103. This will reduce the projection distance from the system imaging focal point FP2 to the position in which the real image 102 is formed. The light from the background monitor 108 or the secondary virtual image target strikes the beamsplitter 104 and reflects at an angle coincident with the viewing axis 118 to FP2. The virtual image 109 of the secondary target or the monitor 108 is formed in front of the curved reflector 103.

Besides the small displays and the UHB display systems, the real image projection system of the present invention can also be applied to a real image projection system having a circular polarizer. The circular polarizer is used for circularly polarizing the light beam in the primary light path between the mirror and the real image, whereby an outside light beam entering the system is substantially blocked before exiting the system, thereby substantially eliminating ghost image formation caused by the outside light sources.

Figure 30:
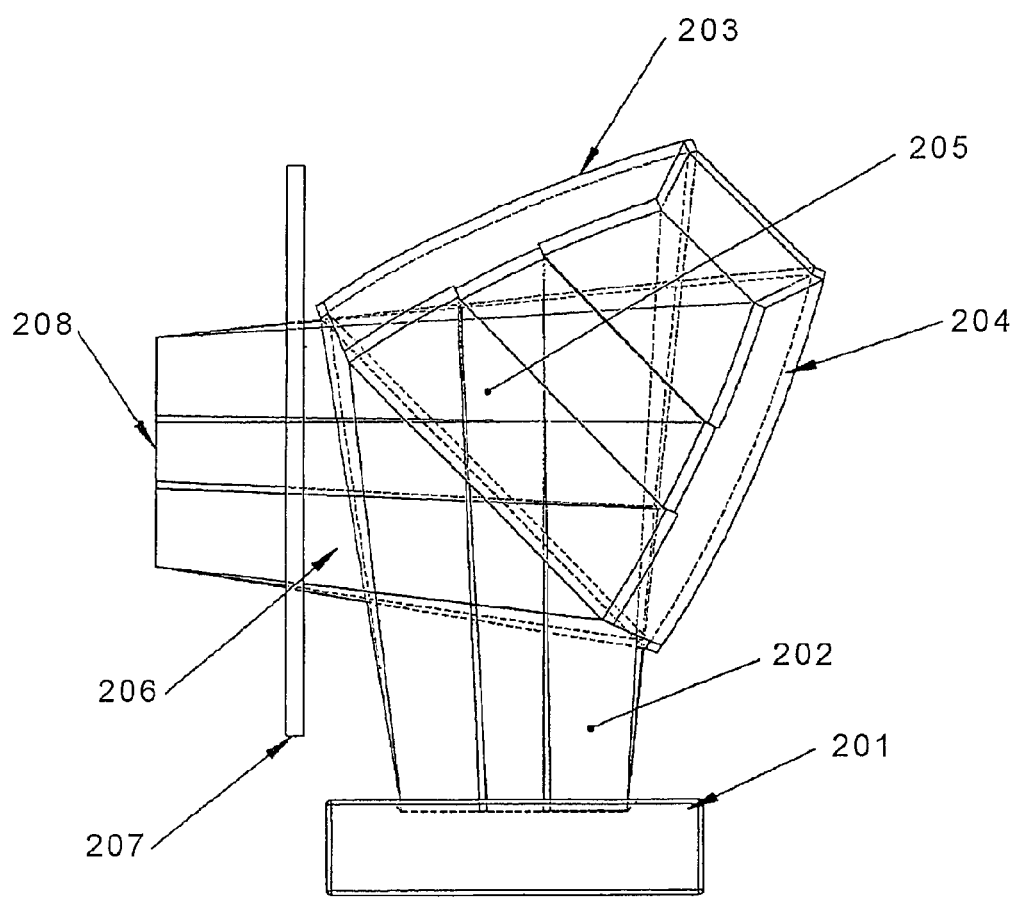
FIG. 30 shows a real imaging system that includes at least one aspheric curved reflector and a circular polarizer or neutral density window for ghost reduction.

The real image projection system having the circular polarizer is shown in FIG. 30. An on-axis dual aspheric imaging system incorporates an image input source 201, two curved reflectors 203 and 204, one of which has an aspheric revolution of curvature, a circular polarizing plate 207, and a real image projection 208. A light 202 from the image source or the monitor 201 strikes the upper curved reflector 203 and reflects in a collimated beam 205 striking the lower curved reflector 204, and then reflects in a converging beam 206 passing through the circular polarizer 207 and forming the real image 208 in free space in front of the display. The circular polarizer 207 is made up of a quarter wave plate attached to a linear polarizing film. The linear polarizing film is on the surface facing the real image and the opposite side from the curved reflectors.

Figure 31:
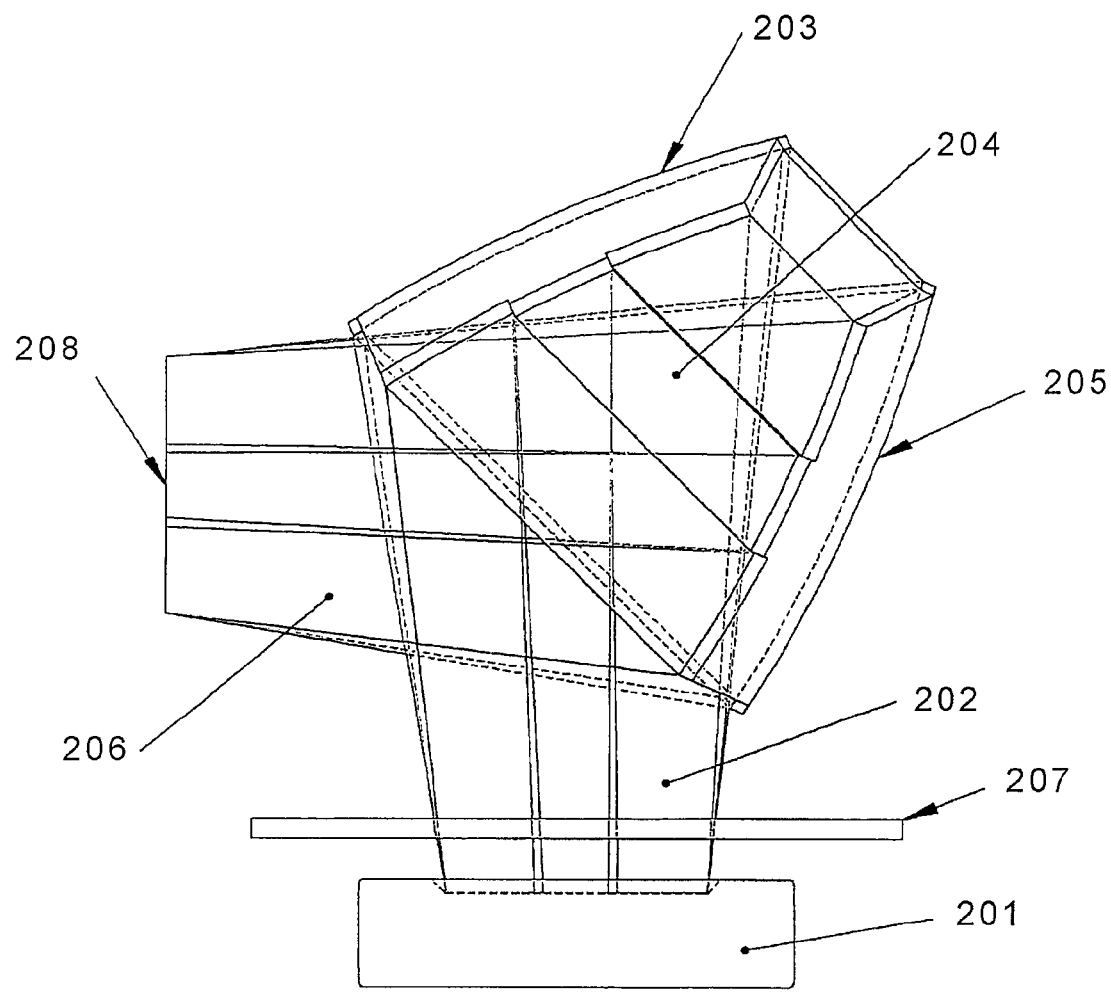
FIG. 31 shows a real imaging system that includes at least one aspheric curved reflector and a circular polarizer positioned in front of the image source to reduce ghosting.

FIG. 31 shows the same system as that of FIG. 30 with the circular polarizer 207 placed in front of the monitor face 201. This prevents the ghost image from being formed and reflected off the screen surface of the monitor 201. LCD monitors typically require a contrast enhancement film to enhance the black levels. By substituting the circular polarizer 207 in front of the LCD monitor 201, the contrast levels are significantly improved and ghost imaging is significantly reduced.

Figure 32:
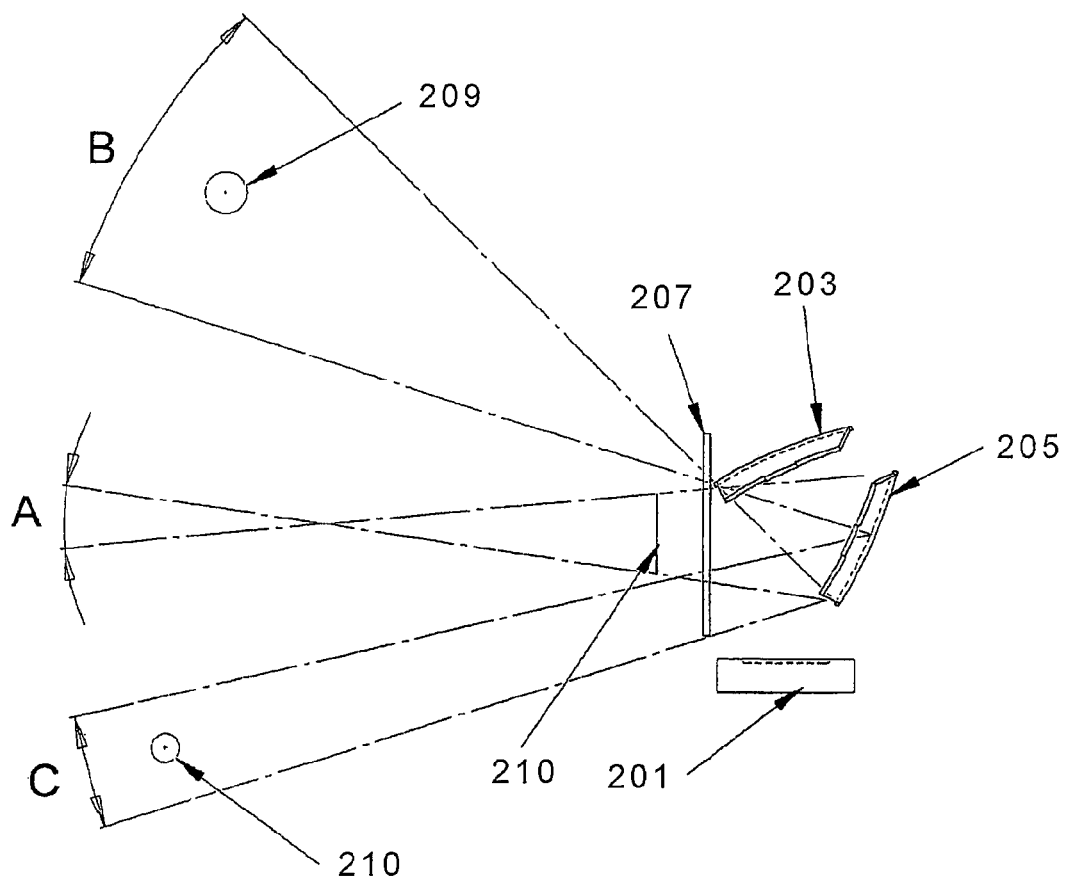
FIG. 32 shows the view area of ghost imaging in a real imaging system that includes at least one aspheric curved reflector.

Referring to FIG. 32, ghost imaging of the real image optical system described in FIG. 30 is described. An external light source 209 enters the system through the view aperture window 207 and strikes the lower curved reflector 205. It is then reflected in a diverging beam, passing through the window 207 to form a ghost image 210 within the viewing area C shown. In a dual aspheric real image system, the ghost images are not visible within the normal viewing area A, but a real ghost image is formed and is visible in an environment where people are sitting or viewing from a lower angle.

Figure 33:
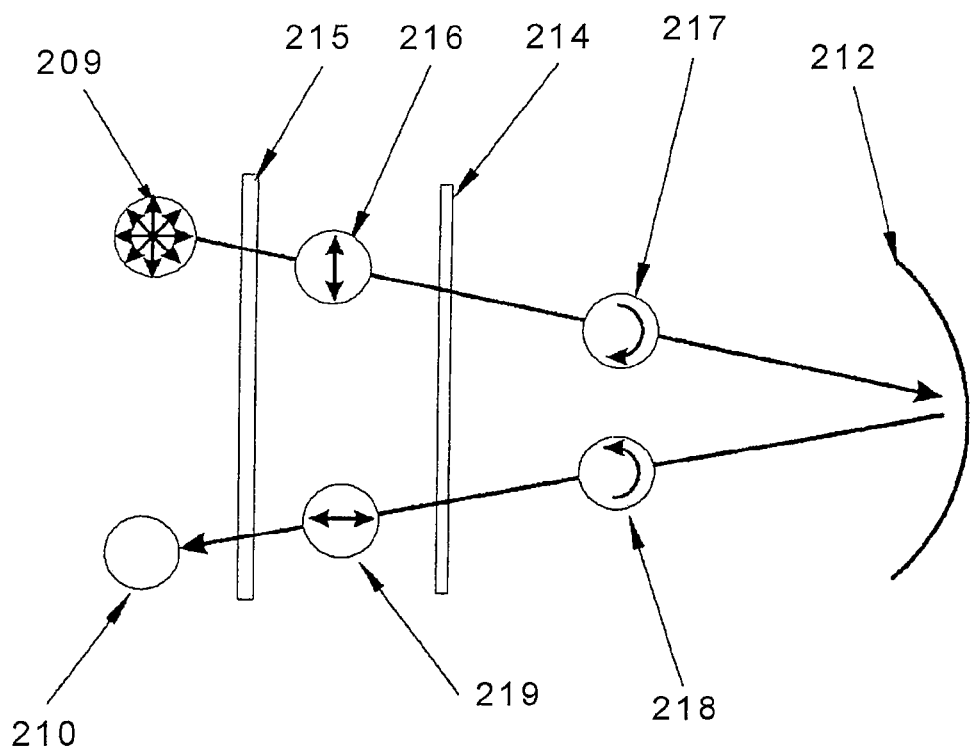
FIG. 33 shows how a circular polarizer reduces ghost imaging.

FIG. 33 shows a tilted real imaging system. The light from the image source 201 strikes a reflective flat mirror 213 and is reflected to a curved reflector 212 whose optical axis is tilted approximately 15 degrees off-axis to the viewing axis. The light beam reflects off of the curved reflector 212 in a diverging beam, passing through the circular polarizer 207 and forming the real image 208 in viewer space. The circular polarizer in the example is right circular and consists of a linear polarizing film and a quarter wave plate. The linear polarizing film faces the real image 208. The light from the outside of the system 209 enters the system passing through the circular polarizer 207, first passing through the linear polarizer becoming vertically polarized, then passing through the quarter wave plate becoming right circular e.g., the right circular polarized light strikes the curved reflector 212, reversing the polarization to left circular. The reflected converging light beam then strikes the circular polarizing window 207, passing first through the quarter wave where the left circular polarized light rotates to horizontally polarized light. The vertical linear polarizing film of the circular polarizer 207 blocks the horizontally polarized light, and therefore no ghost image is visible in the system.

In the present invention, the plastic injection molding method is proposed to manufacture the spherical mirrors such as the curved reflectors or spherical surface mirrors, so as to manufacture the low-cost plastic curved mirrors. The detailed manufacturing flow is illustrated in two different embodiments shown in FIG. 34 to FIG. 37.

According to the above embodiment, the plastic spherical mirror for fabricating the curved reflector or the spherical surface mirror may be fabricated by means of plastic injection molding, so as to make a main body of the plastic parts of the low-cost plastic spherical mirror. In an embodiment of the present invention, the plastic injection molding process may provide a parabolic plastic mirror having a diameter from 5 inches to 36 inches and a size tolerance of +/−0.0001 inches. Although the processing of the plastic injection molding is relatively expensive, the cost for fabricating the plastic parts is very low. By performing the plastic injection molding process according to the embodiment of the present invention, a plurality of complicated geometrical shapes can be regenerated, which is only limited by the manufacturing capability of the metal mold.

In current plastic process, available tools and materials can be used in any combination to achieve the plastic spherical mirror having high quality and low-cost according to the present invention. With the size tolerance of the metal mold selected optionally, the produced plastic parts may be achieved according to specific conditions and can hold a tolerance of several tens inches ‰ or better, as long as the suitable material is carefully selected to satisfy the requirements for thermal stability and durability of glass. In a desirable circumstance, the material may bear operation conditions different from those endured by the conventional glass spherical mirror.

In the embodiment of the present invention, the final surface of the metal mold may be formed by mechanical machining and polishing or other similar processing methods capable of producing sufficient surface quality. The final surface may be of grade A1 or may be regarded to be of the grade for the finest surface of the plastic part.

In the embodiment of the present invention, a parabolic plastic parts having a diameter from 5 inches to 36 inches can be formed by means of plastic injection molding. The procedures of the injection molding of the plastic parts are well-known in this field, and will not be discussed in detail in the present invention.

In a first embodiment, the metal mold used in the plastic injection molding process can provide a general envelope dimension a tolerance of +/−0.030 inches, and provide the plastic parts (not the mirror surface) with a spherical radius tolerance of +/−0.05%. The above tolerances are comparable with those of the glass spherical mirror. The metal mold can hold a tolerance of about +/−0.0001

In the first embodiment of the present invention, several plastic material formulations can be used for fabricating the plastic spherical mirror, which meets several performance standards, such as material strength, thermal stability, water absorption, mold shrinkage, material flow into the mold, UL recognition, manufacturing considerations, surface density, lubricant content and scratch resistance. In an embodiment, this plastic material has 80/50 scratch-dig surface quality or better after being formed by plastic injection molding.

In the first embodiment of the present invention, the plastic material formulation is selected from the group consisting of optical-grade polycarbonate, natural-grade polycarbonate, UV-grade polycarbonate, polyetherimide, glass-filled grade polyetherimide, PMMA, and other comparable plastic material having similar performance standards. The plastic material formulation may be selected according to the accuracy of mold machining and experimental results from the inspection of the parts. In an embodiment, the plastic material has an optical clarity and is substantially clear.

Figure 34:
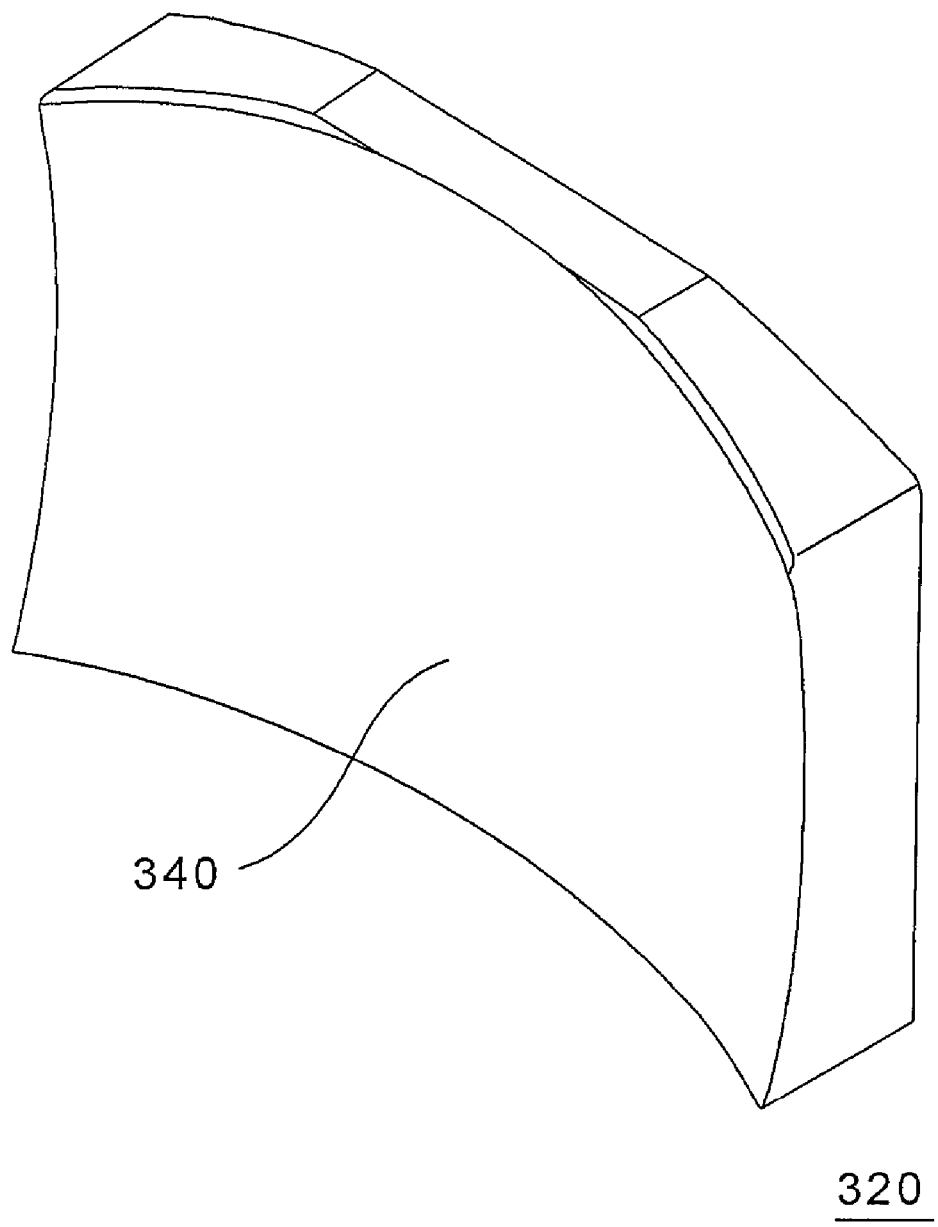
FIG. 34 shows a modified plastic parts used in the plastic spherical mirror according to the present invention.

In the first embodiment of the present invention, the metal layer is coated on the mirror surface of the modified plastic parts through a vacuum metallization process or a vacuum deposition process (see FIG. 34). Alternatively, the plastic spherical mirror may be processed by evaporated metal steam. The thickness of the metal deposited on the plastic surface is preferably 4-8 microns. After the metallization phase, a protective outer coating is coated on the metalized surface. The protective coating may be a resist material or plasticizing liquid that forms a solid film layer at the outside after being cured when exposed to the room temperature.

Figure 35:
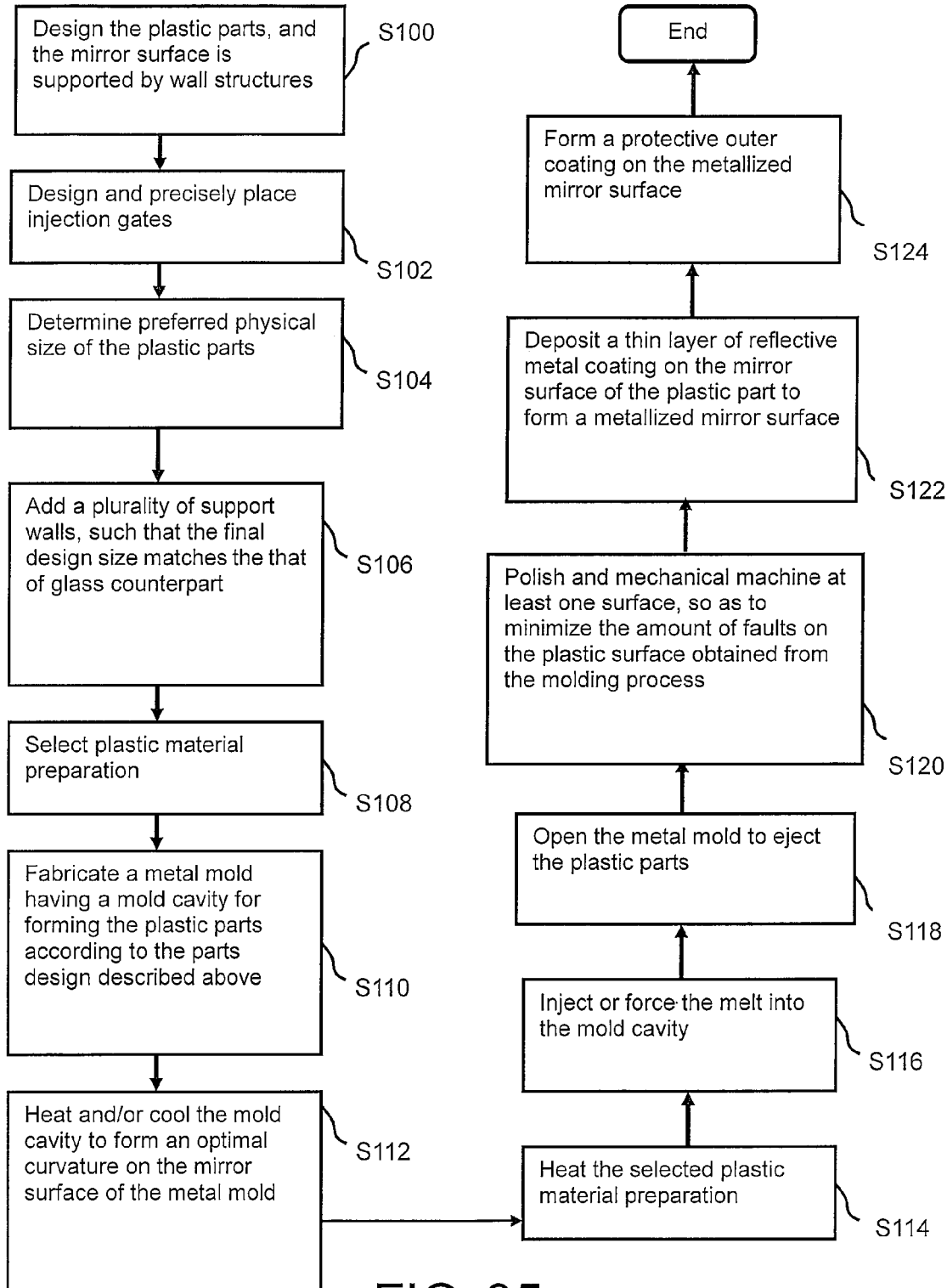
FIG. 35 is a flowchart of the method for manufacturing the plastic spherical mirror according to a first embodiment of the present invention.

The quality control of the surface of the coated plastic material is improved by minimizing the amount of flaws on the plastic surface obtained from the molding process, so the metalized plastic parts having been processed by vacuum metallization has the improved quality. Moreover, as for the mirror surface of the plastic parts underneath, the metallization has superior adhesiveness. Referring to FIG. 35, the method for manufacturing the plastic spherical mirror is shown, in which the plastic parts of relatively thin thickness can keep its form/shape after being heated and cooled, and the method includes the following steps.

Parts Design a) A plastic parts is designed, such that the mirror surface is supported by a plurality of wall structures designed on the entire edge of the mirror, so as to avoid aberration and distortion (S100). The actual number of the wall structures is changed according to the size of the mirror, and may be one for a small mirror, or three or more for a large mirror. Those of ordinary skill in the pertinent art would appreciate that the number of the wall structures is a factor that should be taken into consideration in engineering, and varies according to particular specifications.

b) A plurality of injection gates is designed and placed precisely, so as to ensure the elimination of remnants or knit lines created by plastic resin flow (S102). The actual number of the injection gates may be changed according to the size of the mirror, and may be one for a small mirror, or one or more for a large mirror. Those of ordinary skill in the pertinent art would appreciate that the number of the injection gates is a factor that should be taken into consideration in engineering and varies according to the particular specifications. In an embodiment, at least one injection gate is aligned with each of the wall structures.

c) A preferred physical size of the plastic parts is determined to meet a plurality of optical performance requirements and physical design requirements (S104), including 80/50 scratch-dig surface quality requirements and capability of maintaining the physical dimensions over time.

d) A plurality of support walls is designed and placed in the plastic parts, such that a final dimension of the plastic parts matches that of the glass counterpart (S106).

Material Selection a) The plastic material formulation is selected and used according to plastic parts quality specification and based on an anti-deformation capability (S308). The plastic material may be a material having optical-grade finish, for example, a mirror generally used in making up or other clear plastic material.

Mold Machine Processing a) A metal mold is fabricated, including a mold cavity for forming the plastic parts according to the parts design as described above, in which the mirror surface of the metal mold is polished to a superior optical-grade finish (S110). In a preferred embodiment, the metal mold is made of grade A tool steel.

b) The metal mold is heated and/or cooled so as to form an optimal curvature on the mirror surface of the metal mold (S112).

Plastic Injection Molding a) The selected plastic material formulation is heated until a melt thereof is obtained (S114).

b) The melt is injected or forced into the mold cavity, and the melt is cooled to obtain the plastic parts of a desired size and shape (S116). It should be understood that temperature and flow rate of the melted plastic must be monitored in this injection method, so as to keep a maximum flow rate at the same time minimize turbulence.

c) The metal mold is opened to eject the plastic parts (S118).

d) At least one surface is polished and mechanical machined, so as to minimize surface defects arisen from the molding process (S120).

Mirror Formation a) A thin layer of a reflective metal coating is deposited on the mirror surface of the plastic parts (S122).

b) A protective overcoat is formed on the metalized mirror surface (S124).

The protective overcoat is a resist material or a plastic material, and forms a protective barrier over the mirror prior to assembly after being cured when exposed to the room temperature. The protective overcoat can be removed when the plastic spherical mirror is mounted in an aerial display unit.

Referring to FIG. 34, a modified plastic parts 320 used for the plastic spherical mirror 340 has been modified according to the first embodiment of the present invention.

Figure 36:
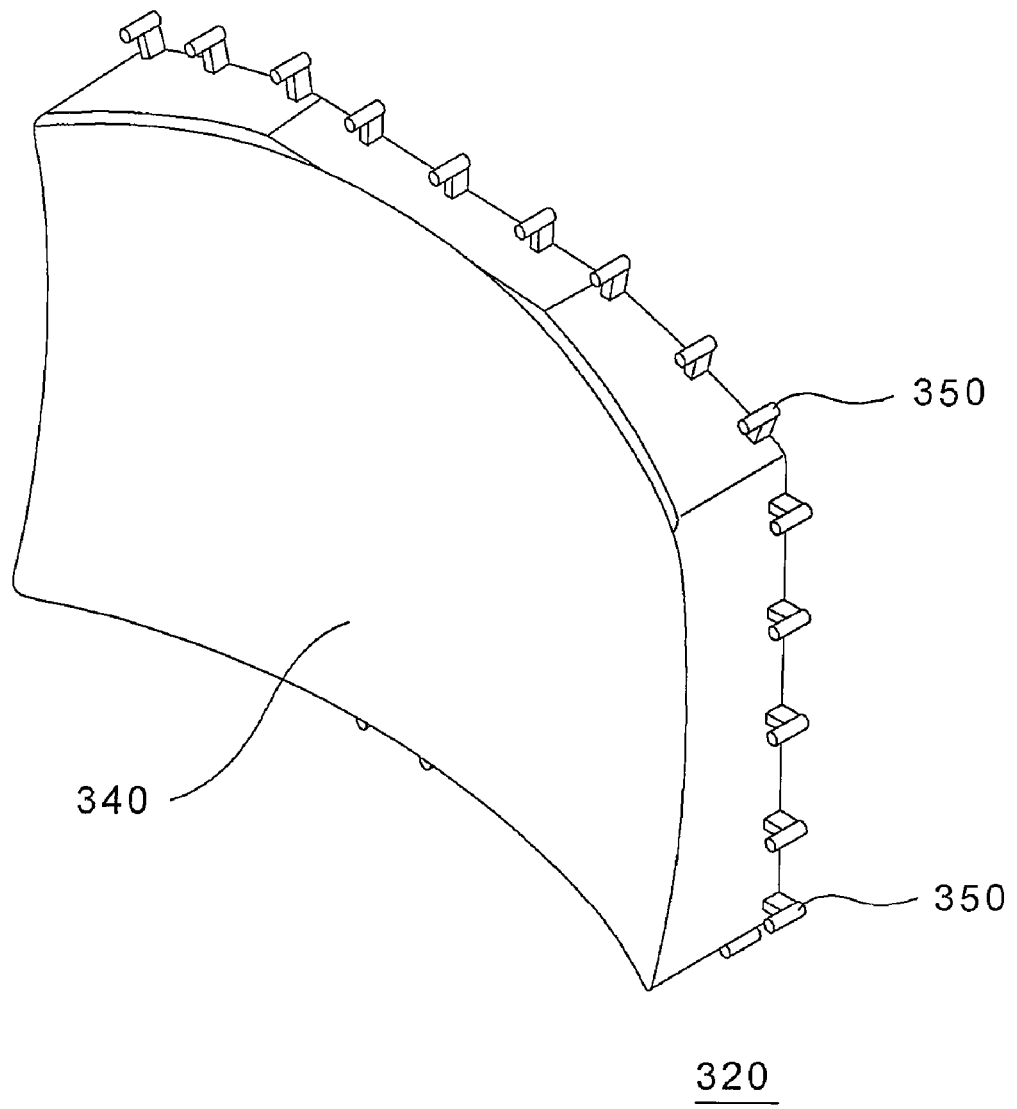
FIG. 36 shows an injection molded plastic parts according to the present invention.
Figure 37:
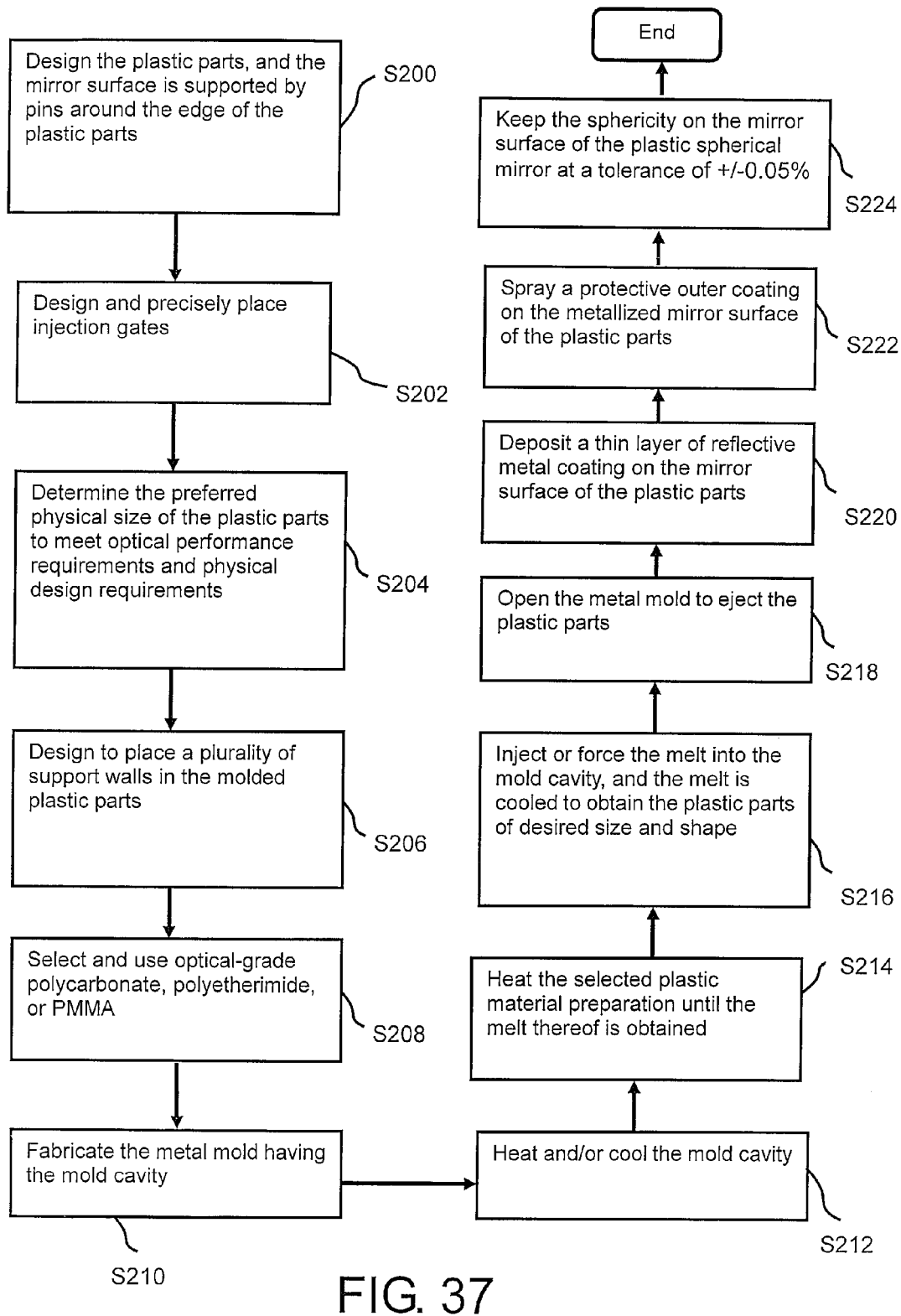
FIG. 37 is a flowchart of the method for manufacturing the plastic spherical mirror according to a second embodiment of the present invention.

Referring to FIG. 36 and FIG. 37, in a second embodiment of the present invention, a method for manufacturing the plastic spherical mirror according to another embodiment of the present invention is shown. The plastic parts must be thick enough to keep its form/shape after being heated and cooled. In an embodiment, the concave area of the mirror has a thickness of 1.0 cm or less, and the spherical body thereof may have a thicker thickness. Generally speaking, the method for manufacturing the plastic parts includes the following steps.

Parts Design a) The plastic parts is designed, such that the frame of the plastic parts is supported by a plurality of ejector pins 350 as shown in FIG.36 (e.g. 28 ejector pins) disposed around the edge of the plastic parts for preventing distortion or twisting thereof, wherein the pins are facilitating part removal from the metal mold without distorting the surface geometry or damaging the mirror surface finish (S200).

b) A plurality of plastic injection gates is designed and placed accurately and evenly, so as to ensure the elimination of the remnants or flow mark created by the plastic resin flow (S202).

c) A preferred physical size of the plastic parts is determined to satisfy a plurality of optical performance requirements and physical design requirements (S204).

d) A plurality of support walls is designed and placed at strategical positions in the plastic parts (S206).

Material Selection a) Optical-grade polycarbonate, polyetherimide, or PMMA is selected as the plastic material formulation serving as the plastic spherical mirror (S208).

Mold Machine Processing a) The mirror surface for the metal mold is polished to A1 surface by the use of high grade steel (S210).

b) The mold cavity is heated and/or cooled to form an optimal curvature on the mirror surface of the metal mold (S212).

Plastic Injection Molding a) The selected plastic material formulation is heated until a melt thereof is obtained (S214).

b) The melt is injected or forced into the mold cavity, and the melt is cooled to obtain the plastic parts of the desired size and shape (S216).

c) The metal mold is opened to eject the plastic parts (S218).

Mirror Formation a) A thin layer of a reflective metal coating is deposited on the mirror surface of the plastic parts through vacuum metallization or vacuum deposition with a thickness of, preferably, four to eight microns to obtain a metalized mirror surface (S220).

b) A protective overcoat is sprayed on the metalized mirror surface (S222).

Finished Parts Inspection a) The sphericity on the mirror surface of the plastic spherical mirror is held at a tolerance of +/−0.05% (S24).

Referring to FIG. 7, the injection molded plastic parts according to the first embodiment of the present invention is shown. The pins are disposed around the edge of the plastic parts, so as to allow the parts to be removed from the metal mold without having the geometrical shape of the surface distorted or the mirror surface damaged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A real image projection device, comprising:
   a) a plastic curved mirror, with an optical axis at a tilted angle relative to an imaging axis of the image projection system;
   b) a target object, positioned below the plastic curved mirror, facing toward a front of the image projection system, wherein a target object is selected from a group consisting of a real object, a graphic image, a video image, and any object that reflects, transmits, or emits a light beam;
   c) a flat fold mirror or a reflector, positioned below a viewing window of the image projection system, wherein a reflective surface of the flat fold mirror or the reflector faces towards the plastic curved mirror and toward the target object, the flat fold mirror or the reflector is positioned at an angle such that a target beampath is reflected at a complimentary angle from the target object to the fold mirror to the plastic curved mirror, and a center or a vertex of the plastic curved mirror is struck at an angle equal to twice the tilted angle of the plastic curved mirror relative to the imaging axis;
   d) a transparent reflective substrate, selected from a group consisting of glass, plastic, mylar, and any transparent material that has a reflectivity of between about 3% and 5% on a front surface thereof, and having a rear surface coated with an anti-reflective coating resulting in between about 0.5% and 1% reflectivity, the transparent reflective substrate being positioned at an inclined angle with the front surface facing an observer, a top edge of the transparent substrate being nearest to the fold mirror and a bottom edge of the substrate being located directly over the fold mirror, such that a beamsplitter does not intersect the target beampath from the target object to the fold mirror to the plastic curved mirror;
   e) a secondary image source, comprising a monitor, video images, static images, or the real object, positioned vertically above the transparent reflective substrate, such that light beam from the secondary image source is reflected along an image path, forming a virtual image directly behind a real image; and
   a neutral density window or a circular polarizer window, positioned along an imaging axis of the system, wherein the neutral density window comprises a neutral density material, or a neutral density coating, wherein light transmitting through the neutral density window is partially absorbed in near equal amounts across a visible light spectrum.

2. The aerial real image projection device as claimed in claim 1, wherein the plastic curved mirror comprises:
   a plurality of plastic parts, wherein a mirror surface of the plastic parts is supported by a plurality of wall structures on an edge of a mirror, wherein the mirror surface comprises a sphericity, a physical size, an optical-grade surface, and a curvature, and wherein the plastic curved mirror comprises a thin layer of a reflective metal coating and a protective overcoat fanned on the mirror surface.

3. The real image projection device as claimed in claim 2, wherein the plastic part comprises a plurality of ejector pins disposed around the edge of the plastic part.

4. The real image projection device as claimed in claim 2, wherein a plastic material formulation of the plastic parts is selected based on a plurality of performance criteria relating to material strength, thermal stability, water absorption, mold shrinkage, material flow into the mold, UL recognition, manufacturing considerations, surface density, lubricant content, and scratch resistance.

5. The real image projection device as claimed in claim 2, wherein the plastic material formulation of the plastic parts is selected from a group consisting of optical-grade polycarbonate, natural-grade polycarbonate, UV-grade polycarbonate, polyetherimide, glass-filled grade polyetherimide, and PMMA.

* * * * *